United States Patent
Miller et al.

(10) Patent No.: US 12,466,774 B2
(45) Date of Patent: *Nov. 11, 2025

(54) METHODS OF INCREASING IRRIGATION WATER AND FERTILIZER DELIVERY TO SOIL USING FORMIC ACID AND FORMATE SALTS, MAKING A FORMATE SALT FROM CARBON DIOXIDE, AND GENERATING A CARBON CREDIT

(71) Applicant: Deerpoint Group, Inc., Madera, CA (US)

(72) Inventors: John C. Miller, Fresno, CA (US); Deborah L. Miller, Fresno, CA (US); Trevor J. Morgan, Madera, CA (US)

(73) Assignee: Deerpoint Group, Inc., Madera, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/959,488

(22) Filed: Nov. 25, 2024

(65) Prior Publication Data

US 2025/0091967 A1   Mar. 20, 2025

Related U.S. Application Data

(63) Continuation-in-part of application No. 18/454,062, filed on Aug. 22, 2023, now Pat. No. 12,221,395.

(51) Int. Cl.
*C05G 5/23* (2020.01)
*A01C 23/04* (2006.01)
(Continued)

(52) U.S. Cl.
CPC ............. *C05G 5/23* (2020.02); *A01C 23/042* (2013.01); *C05B 17/00* (2013.01); *C05C 1/00* (2013.01);
(Continued)

(58) Field of Classification Search
CPC .. C05F 11/00; C05D 9/02; C05G 5/23; C05B 17/00; C05C 1/00; C05C 9/00
See application file for complete search history.

(56) References Cited

U.S. PATENT DOCUMENTS

| 4,337,786 A | 7/1982 | Myers et al. |
| 8,821,646 B1 | 9/2014 | Miller et al. |

(Continued)

FOREIGN PATENT DOCUMENTS

EP      0357243 A2   3/1990

OTHER PUBLICATIONS

Laurenczy, "Hydrogen storage and delivery: the carbon dioxide-formic acid couple," Chimia (Aarau), 2011; 65(9):663-6, doi: 10.2533/chimia.2011.663; Abstract.
(Continued)

*Primary Examiner* — Wayne A Langel
(74) *Attorney, Agent, or Firm* — Central California IP Group, P.C.; Andrew D. Fortney

(57) ABSTRACT

A method of increasing delivery of irrigation water and optionally a fertilizer to a predetermined depth in soil containing agricultural crops is disclosed. The method includes introducing formic acid to irrigation water to form a formate-enhanced irrigation water having a formate concentration of from about 10 ppm to about 10,000 ppm, and distributing the formate-enhanced irrigation water to the soil in an amount sufficient to (i) increase a flow rate of the irrigation water through the soil, (ii) reduce a compaction of the soil, and/or (iii) reduce a calcium concentration in the soil. Methods of making a formate salt from carbon dioxide, a hydrogen source and an alkali metal, alkaline earth metal, or ammonia source and generating carbon credits are also disclosed.

20 Claims, 7 Drawing Sheets

(51) Int. Cl.
*C05B 17/00* (2006.01)
*C05C 1/00* (2006.01)
*C05C 9/00* (2006.01)
*C05D 9/02* (2006.01)
*C05F 11/00* (2006.01)

(52) U.S. Cl.
CPC ............... *C05C 9/00* (2013.01); *C05D 9/02* (2013.01); *C05F 11/00* (2013.01)

(56) References Cited

U.S. PATENT DOCUMENTS

| | | |
|---|---|---|
| 9,148,993 B1 | 10/2015 | Miller et al. |
| 9,161,489 B1 | 10/2015 | Miller et al. |
| 9,439,345 B1 | 9/2016 | Miller et al. |
| 9,474,215 B1 | 10/2016 | Miller et al. |
| 9,856,179 B2 | 1/2018 | Miller et al. |
| 10,046,369 B1 | 8/2018 | Miller et al. |
| 10,233,128 B1 | 3/2019 | Miller et al. |
| 10,271,474 B1 | 4/2019 | Miller et al. |
| 10,287,507 B2 | 5/2019 | Ravikumar |
| 10,493,499 B1 | 12/2019 | Miller et al. |
| 10,632,508 B1 | 4/2020 | Miller et al. |
| 10,645,868 B2 | 5/2020 | Miller et al. |
| RE49,085 E | 5/2022 | Miller et al. |
| 11,615,428 B1 | 3/2023 | Joseph et al. |
| 12,221,395 B1 * | 2/2025 | Miller ................... A01C 21/00 |
| 2016/0185673 A1 | 6/2016 | Miller et al. |

OTHER PUBLICATIONS

Jin et al., "Catalytic transfer hydrogenation of CO2 to formic acid with glycerol as the hydrogen donor over Ru-REUSY catalysts," Molecular Catalysis, vol. 551, Dec. 2023, 113655; doi.org/10.1016/j.mcat.2023.113655.

Chiang et al., "Conversion of hydrogen/carbon dioxide into formic acid and methanol over Cu/CuCr2O4 catalyst," International Journal of Hydrogen Energy, vol. 42, Issue 37, Sep. 14, 2017, pp. 23647-23663; doi.org/10.1016/j.ijhydene.2017.04.226.

Ehmann et al., "Carbon Dioxide Hydrogenation to Formic Acid with Self-Separating Product and Recyclable Catalyst Phase," ChemCatChem, 2022, 14, e202200892; Wiley-VCH GmbH.

Falivene et al., "Fertigation equipment for orchards," Dec. 2011, Primefact 1144, First edition; Department of Primary Industries, NSW Government; dpi.nsw.gov.au.

Wei et al., "Reversible hydrogenation of carbon dioxide to formic acid using a Mn-pincer complex in the presence of lysine," Nature Energy, vol. 7, 438, May 2022, 438-447, nature.com/natureenergy; doi.org/10.1038/s41560-022-01019-4.

"Fertigation: All-The-Rage Agricultural Technology," May 18, 2023; eos.com/blog/fertigation/#:~:text=Fertigation technology suggests sprinkling fertilizers,pH levels and electric conductivity.

"The Basics of Fertigation: How Growers Can Implement Fertigation Systems," growspan.com/news/the-basics-of-fertigation-how-growers-can-implement-fertigation-systems/.

Mariyaselvakumar et al., "Hydrogenation of carbon dioxide to formic acid over Pd doped thermally activated Ni/Al layered double hydroxide," Abstract; Reaction Kinetics, Mechanisms and Catalysis, vol. 135, pp. 3007-3019, Oct. 25, 2022.

Weilhard et al., "Efficient carbon dioxide hydrogenation to formic acid with buffering ionic liquids," Nature Communications, (2021) 12:231, doi.org/10.1038/s41467-020-20291-0; nature.com/naturecommunications; doi.org/10.1038/s41467-020-20291-0.

Aylward, "What's Inside the White Box is Secret, But What's Outside is Obvious—Precision Fertilization," deerpointgroup.com/white-box; publication date unknown.

* cited by examiner

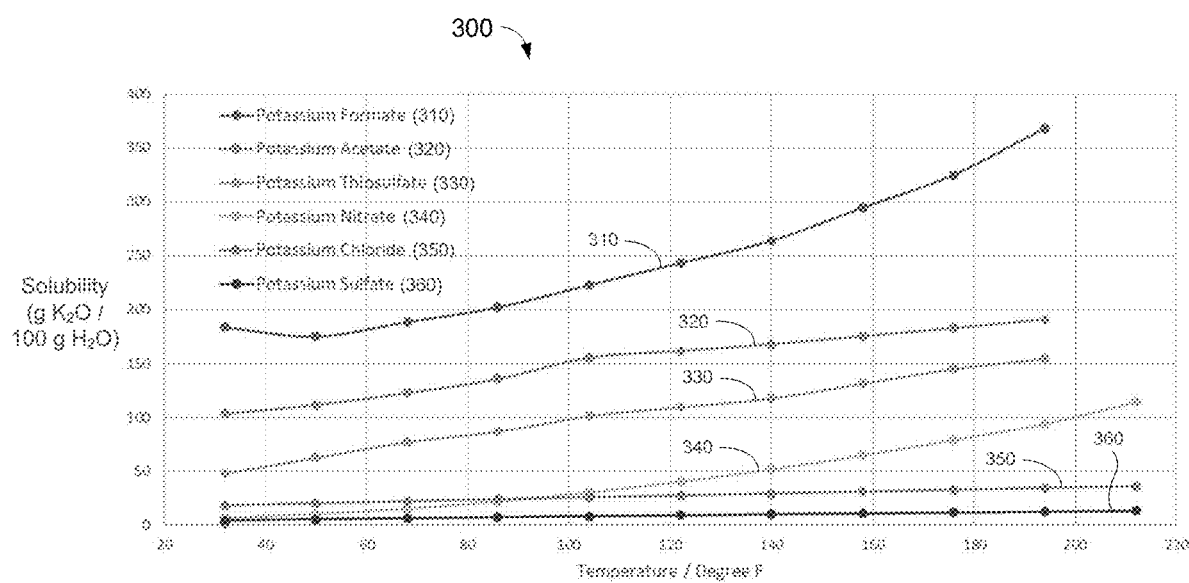

METHODS OF INCREASING IRRIGATION WATER AND FERTILIZER DELIVERY TO SOIL USING FORMIC ACID AND FORMATE SALTS, MAKING A FORMATE SALT FROM CARBON DIOXIDE, AND GENERATING A CARBON CREDIT

CROSS-REFERENCE TO RELATED APPLICATIONS

This application is a continuation-in-part of U.S. patent application Ser. No. 18/454,062, filed on Aug. 22, 2023, pending, the contents of which are incorporated by reference herein in its entirety.

FIELD OF THE INVENTION

The present invention generally relates to the field of fertilization and/or irrigation of agricultural land. More specifically, embodiments of the present invention pertain to a method of increasing delivery of irrigation water, and optionally, a fertilizer to a predetermined depth in soil containing agricultural crops using formic acid and/or a formate salt.

DISCUSSION OF THE BACKGROUND

The agriculture industry has developed the practice of adding plant nutrients and soil amendments to the plant environs, such as the soil, to enhance crop growth and subsequent yields. These fertilizers and amendments come in a variety of formulations depending on the specific crop to be grown and its nutrient requirements.

Fertilization methods ultimately were facilitated by the practice of adding inorganic fertilizers and soil amendments to the water being used to irrigate the crops. The term "fertigation" is sometimes used for this combination of irrigation and fertilization. Fertigation refers to the application of fertilizers through irrigation systems in agriculture. It is a process that involves mixing fertilizer with irrigation water and applying it directly through the irrigation system. This method provides plants with a consistent supply of nutrients throughout the growing season, which can improve crop yield and quality.

Fertigation systems typically use a pump to inject the fertilizer solution into the irrigation water, which is then distributed to the plants. The fertilizer solution can be customized to meet the specific needs of different crops, which can help to optimize plant growth and development. Fertigation allows for more precise nutrient management, as fertilizer can be applied in the exact amount and at the right time when plants need it most. It also reduces the risk of fertilizer runoff, which can contaminate nearby water sources and harm the environment.

Hard irrigation water (e.g., containing a relatively high concentration of calcium ions) and dissolved carbonates in irrigation water can pose challenges when the corresponding ions accumulate in the soil. As the ions accumulate over time, they can cause a shift towards alkaline soil conditions. Alkaline soil conditions can hinder nutrient availability to plants and disrupt soil microbial activity, affecting overall plant health and productivity. For example, when irrigation water containing high levels of calcium or dissolved carbonates is applied to the soil over time, the resulting insoluble carbonate compounds (e.g., calcium carbonate) can accumulate within the soil profile. This buildup can cause soil to become compacted, reducing soil permeability, hindering water movement, nutrient availability, and root growth.

Insoluble carbonate salts can cause soil compaction. For example, as calcium carbonate accumulates in soil, it can cement soil particles together, leading to the development of compacted soil aggregates. Compacted soil aggregates have reduced pore spaces, limiting air circulation and root penetration, and resulting in the formation of dense layers that impede water infiltration and drainage. Compacted soil restricts root growth and nutrient uptake, decreases soil permeability, and restricts the movement of water through the soil, leading to waterlogging, increased runoff, and decreased water-holding capacity.

Potassium formate is a known, commercially available potassium fertilizer (see, e.g., U.S. Pat. Nos. RE49,085, 9,148,993, 9,161,489, 9,474,215 and 9,856,179). Potassium formate has been used by growers as a potassium source for fertilization, providing a potassium fertilizer that contains an organic anion (i.e., containing primarily C, H, and O) that enhances the efficacy of the potassium nutrient. One way to make potassium formate is by reacting formic acid with potassium hydroxide according to the following equation:

$$HOC(O)H + KOH \rightarrow KOC(O)H + H_2O \qquad (1)$$

Traditionally, potassium formate is and has been prepared by numerous methods. Among some of the more common processes are:

Producing formic acid by high-pressure reaction of carbon monoxide with water, separating the formic acid, and then reacting it with potassium hydroxide;

Carbonylation of methanol to form methyl formate, followed by hydrolysis of the methyl formate to formic acid, separation of the formic acid, and reaction of the separated formic acid with potassium hydroxide;

Isolating formic acid (e.g., as a byproduct) in polyol synthesis, then reacting the isolated/separated formic acid with potassium hydroxide;

High temperature oxidation of biomass and recovery of formic acid therefrom, then reacting the recovered formic acid with potassium hydroxide; and Direct synthesis by the high pressure-high temperature reaction of carbon monoxide with potassium hydroxide.

The last process mentioned above works well and gives potassium formate in good yield. The reaction is typically carried out at a pressure of 450 psi (using high-pressure carbon monoxide) at a temperature of 250° C. However, this process has a number of disadvantages.

For example, it requires a nearby and/or adjacent carbon monoxide pipeline to be economical. The cost of the raw materials, as well as the transportation of the carbon monoxide using the pipeline, can become prohibitive.

Commercial autoclaves that can accommodate a 450-psi pressure reactor are also cost-prohibitive because of size, throughput, and material limitations. Typical autoclaves that can accommodate this pressure are about 6500 gallons in size. The cycle time to manufacture a batch of potassium formate in an autoclave of this size is about 6 hours, so a single autoclave can make only a very small number of batches of potassium formate per day. Therefore, to obtain the throughput necessary to manufacture a volume of potassium formate suitable for agricultural purposes, many such high-pressure reactors are required. In addition, high-pressure autoclaves require construction with stainless steel walls that are several inches thick (for safety at such high pressures).

Problems associated with commercial high-pressure autoclaves can be overcome by a continuous process, which can reduce the capital expense of the high-pressure autoclave reactors, but which require recycling of potentially large quantities of carbon monoxide. The equipment, time and space necessary to recycle and store large volumes of carbon monoxide are also costly, and can be complicated (e.g., due to engineering and safety concerns).

As climate change becomes a growing global priority, more and more companies and individuals are looking to understand the price of carbon credits to offset their carbon footprints to reach net zero. Carbon credits have gained significant momentum in recent years, with thousands of governments, businesses, and individuals investing in them to reduce their carbon footprint. Carbon credits are a market-based approach to incentivize businesses and individuals to offset their own carbon emissions by investing in other carbon reduction projects. In 2021 alone, the market was estimated to be worth $2 billion.

The terms "carbon credits" and "carbon offsets" are often used interchangeably. They both refer to one metric ton (1000 kg) of carbon emissions that have been removed or kept from entering the atmosphere. A carbon credit becomes a carbon offset when it is used to compensate for one's carbon emissions.

More specifically, a carbon credit is an accounting unit that represents one metric ton of carbon, either removed from the atmosphere (e.g., by planting a tree that absorbs carbon dioxide) or kept from entering the atmosphere (e.g., by protecting a tree that otherwise would be cut down and release its carbon into the atmosphere). A carbon offset may more specifically refer to a carbon credit that is used to compensate for the carbon emissions that come from an organization or individual. The claim of a carbon offset can only be made after a corresponding carbon credit has been "retired"—which means it has been consumed, and cannot be resold or reused.

Once a buyer purchases a carbon credit, they must then take a second step in order to claim it as an offset. The buyer must "retire" the credit, which means it cannot be resold or reused. In commerce, carbon credits and carbon offsets serve as environmental currency. There are two main markets where these transactions occur: the voluntary carbon market (VCM) and the compliance carbon market. The voluntary market can almost be seen as a charitable donation, where companies choose to offset their emissions out of a sense of corporate social responsibility. On the other hand, the compliance market is akin to paying taxes, where companies are legally required to offset a certain amount of their emissions under environmental regulations.

Supplying carbon credits to the market for sale involves several steps. First, one must register the carbon credit project, then have the emission reductions verified, and finally receive the carbon credits issued by a registry. Independent third-party verifiers (e.g. Verra, Gold Standard, American Carbon Registry, Climate Action Reserve, Bio-Carbon Registry, Social Carbon, Plan Vivo, Puro.earth, etc.) oversee the entire process to ensure the integrity and accuracy of the carbon credit. The purchase process is typically straightforward, and involves a payment to the supplier from a purchaser, who receives a form of confirmation or certificate of purchase.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to a method of increasing delivery of irrigation water and optionally a fertilizer to a predetermined depth in soil containing agricultural crops. Formic acid and/or a formate salt is introduced to irrigation water to form a formate-enhanced irrigation water having a formate concentration from about 10 ppm to about 10,000 ppm. The formate-enhanced irrigation water is distributed to the soil in an amount sufficient to (i) increase a flow rate of the irrigation water through the soil, (ii) reduce compaction of the soil, and/or (iii) reduce the calcium concentration in the soil.

In some embodiments, the formate-enhanced irrigation water comprises an amount of formic acid from about 100 parts per million (ppm) to about 1000 parts per million, by moles or by weight. Alternatively, the formate-enhanced irrigation water may contain from 0.001 to 1.0 parts by weight of formic acid per 100 parts by weight of the formate-enhanced irrigation water. In other or further embodiments, sufficient formic acid may be distributed to the soil to decrease a pH (e.g., acidify), an alkalinity and/or a salinity of the soil.

In some embodiments, the method may further comprise percolating the formate-enhanced irrigation water into the soil, through a root zone of the agricultural crops in the soil. In such embodiments, the formate-enhanced irrigation water may comprise formic acid, and distributing the formate-enhanced irrigation water may comprise reacting the formic acid with one or more alkaline salts or compounds in the soil to form one or more water-soluble formate salts. The alkaline salts may include carbonate and bicarbonate salts, and the alkaline compounds may include metal oxides and/or hydroxides. In what may be characterized as an ion exchange reaction in the soil, formate salts having cations such as potassium or ammonium that form a water-soluble carbonate and/or bicarbonate can also be reacted with one or more carbonate salts in the soil to form one or more water-soluble formate salts (e.g., calcium formate from calcium carbonate in the soil) and one or more water-soluble carbonates and/or bicarbonates. In the case of formic acid and a metal oxide or hydroxide, the ion exchange reaction may form one or more water-soluble formate salts and water. Thus, when the formate salt is introduced to the irrigation water, the formate salt may be selected from calcium formate, potassium formate, and ammonium formate.

In some embodiments, sufficient formic acid is distributed to the soil to leach or carry the water-soluble formate salt(s) below a root zone of the agricultural crops in the soil. In one example, the carbonate salt(s) in the soil may inhibit absorption of the irrigation water into the soil. In another example, the water-soluble formate salt(s) comprise calcium formate. In other or further embodiments, the method may further comprise filtering the irrigation water prior to adding the formic acid to the irrigation water.

In some embodiments, the formic acid may be introduced to the irrigation water using a pump, in which case the method may further comprise controlling one or more settings of the pump using a controller in electrical communication with the pump. The setting(s) of the pump may be configured to provide an amount of the formic acid and/or formate salt to the irrigation water to result in the formate-enhanced irrigation water having the formate concentration. In such embodiments, the formic acid and/or formate salt provided to the irrigation water may be an aqueous solution, in an amount of from 1% by weight or volume, up to the solubility limit of the formic acid and/or formate salt (e.g., 99% by weight or volume in the case of formic acid). The method may also further comprise (a) storing in the controller (i) a target for the amount of formic acid and/or formate salt to add to the irrigation water over a predetermined amount of time and (ii) the settings for the pump corresponding to the amount of formic acid and/or formate salt to be added over the predetermined amount of time; (b) comparing actual amounts of the formic acid and/or formate salt delivered over the predetermined amount of time with the target; and/or (c) adjusting the settings for the pump to move the actual amount of formic acid and/or formate salt delivered over the predetermined amount of time towards the target using the controller.

Other or further embodiments of the method may further comprise adding the fertilizer to additional irrigation water to form fertigation water, and distributing the fertigation water through an irrigation system to the soil. In such embodiments, the fertilizer comprises at least one of a nitrogen fertilizer, a phosphorus fertilizer, and a potassium fertilizer. The nitrogen fertilizer may be selected from the group consisting of ammonium salts, nitrate salts, urea, amino acids (e.g., glycine, alanine, arginine, histidine, leucine, isoleucine, valine, commercially-available amino acid mixtures, etc.), and combinations thereof. The phosphorus fertilizer may be selected from the group consisting of phosphoric acid, water-soluble monobasic phosphate salts and dibasic phosphate salts, and combinations thereof. The potassium fertilizer may comprise one or more potassium salts. In such cases, the method may further comprise adding one or more micronutrients to the irrigation water, the formate-enhanced irrigation water, or the fertigation water. The micronutrient(s) may be selected from the group consisting of zinc, iron, manganese, calcium, boron, magnesium, copper, cobalt and molybdenum. The fertigation water may be delivered at a periodic interval selected from multiple days per week, multiple weeks in a season, and multiple days in a season.

In one or more embodiments, adding the formic acid and/or formate salt to the irrigation water comprises slug-feeding the formic acid to the irrigation water. Alternatively, the formic acid and/or the formate salt may be introduced to the irrigation water as an aqueous solution that contains the formic acid and/or the formate salt in a concentration of from 1% to 99% by weight, and the aqueous solution is introduced to the irrigation water at a flow rate ratio of 0.1:1000 to 10:1000. For example, the aqueous solution may be introduced to the irrigation water at a flow rate of 0.1-10 gal/min (0.4-40 l/min) for every 1000 gal/min (4000 l/min) of irrigation water distributed to the soil. In either case, the formate-enhanced irrigation water may be slug-fed to the soil.

A further aspect of the invention concerns a method of making a formate salt, comprising reacting carbon dioxide and a hydrogen source at a temperature greater than room temperature and at a pressure greater than or equal to ambient or atmospheric pressure to make formic acid, then reacting the formic acid with an alkali metal, alkaline earth metal, or ammonia source to produce the formate salt. Typically, the hydrogen source is hydrogen gas, and the alkali metal, alkaline earth metal, or ammonia source is an alkali metal hydroxide, an alkaline earth metal hydroxide, or ammonium hydroxide. For example, the alkali metal hydroxide may be potassium hydroxide, and the alkaline earth metal hydroxide may comprise calcium hydroxide (e.g., lime).

In some embodiments, the carbon dioxide and the hydrogen source are reacted in the presence of a catalyst. The catalyst may comprise a transition metal selected from ruthenium, rhodium, copper, palladium, nickel, manganese, iron, cobalt and combinations thereof, and the catalyzed reaction may be homogeneous or heterogeneous. The carbon dioxide and the hydrogen source may be reacted in a batch reactor or a continuous reactor. The batch reactor may have a volume of 1000 liters or more, and may have a motor-operated stirrer or mixer configured to mix the reaction medium. In one embodiment, the carbon dioxide and the hydrogen source are reacted continuously in a first continuous reactor, the formic acid and the alkali metal, alkaline earth metal, or ammonia source are reacted continuously in a second continuous reactor, and the formic acid is continuously transferred from the first continuous reactor to the second continuous reactor.

In various embodiments (e.g., in the presence of the catalyst), the carbon dioxide and the hydrogen source may be reacted at a temperature of 50-200° C. and/or at a pressure of 20-200 atm. The ratio of partial pressures of the carbon dioxide and the hydrogen may be in a range of 1:1 to 1:5.

In further embodiments, the carbon dioxide and the hydrogen source may be reacted with a co-reactant to form a formic acid:co-reactant adduct or combination, and the formic acid:co-reactant adduct or combination is subsequently reacted with the alkali metal, alkaline earth metal, or ammonia source to form the formate salt and release the co-reactant. Thus, the method may further comprise recovering the released co-reactant, and repeating the carbon dioxide reduction reaction and formic acid neutralization reaction with the recovered co-reactant.

Yet another aspect of the invention concerns a method of generating a carbon credit, comprising making a formate salt by the present method of making the formate salt, where at least 1000 kg of the carbon dioxide is in the formate salt, and verifying that the formate salt includes at least 1000 kg of the carbon dioxide to generate the carbon credit. The method may further comprise registering the method of making the formate salt as a carbon credit project with a registry, and receiving the carbon credit from the registry.

The present invention advantageously improves water permeation through soil in which plants or crops are growing or are to be grown. Other advantages include increased uptake of nutrients and micronutrients by the plants or crops, decreased compaction of the soil, and increased aeration of the soil. The present invention also provides other advantages as described below.

These and other advantages of the present invention will become readily apparent from the detailed description of various embodiments below.

BRIEF DESCRIPTION OF THE DRAWINGS

FIG. 7 is a graph showing the solubilities of various potassium fertilizers as a function of temperature.

Like elements in the various figures are denoted by like reference numerals for consistency.

DETAILED DESCRIPTION

Figure 1:
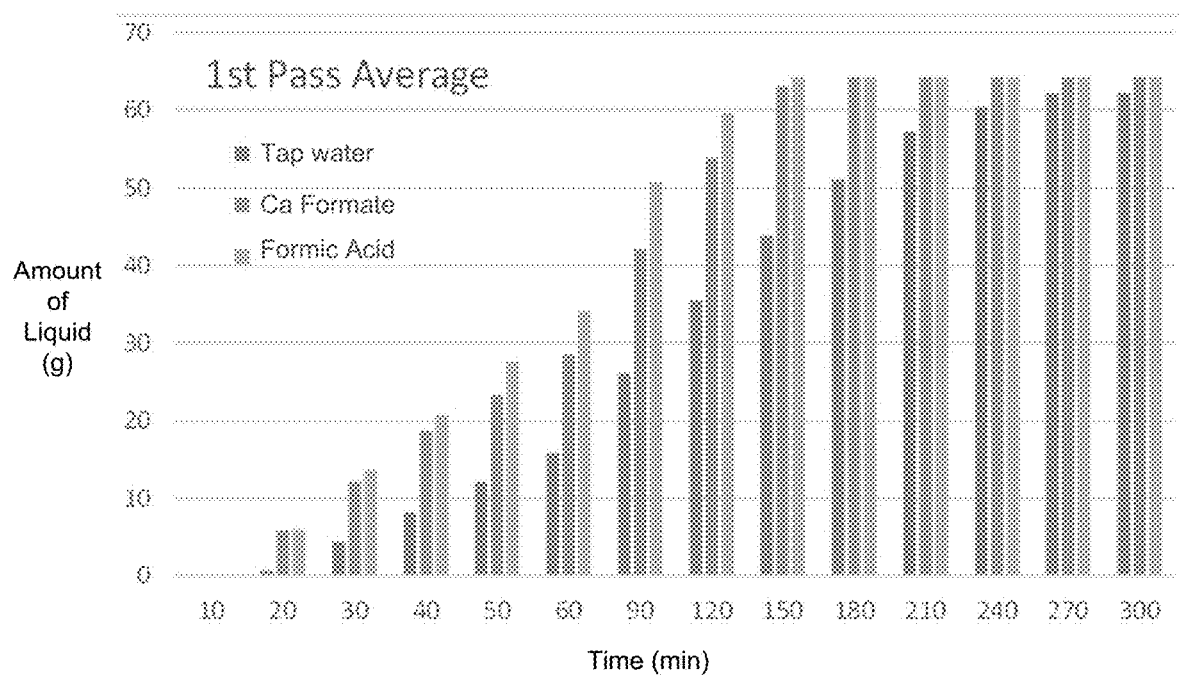
FIG. 1 is a bar graph showing results for a first pass soil permeation test through a first soil sample, comparing one or more embodiments of the invention with one or more prior approaches.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, the terms "data" and "information" are generally used interchangeably herein, but are generally given their art-recognized meanings. Also, for convenience and simplicity, the terms "location" and "site" may be used interchangeably, as may the terms "connected to," "coupled with," "coupled to," and "in communication with," but these terms are also generally given their art-recognized meanings.

The invention, in its various aspects, will be explained in greater detail below with regard to exemplary embodiments.

An Exemplary Method of Applying Formic Acid or Formate Ions to Soil to Increase the Ability of Irrigation/Fertigation Water to Permeate the Soil Illustrative embodiments recognize and take into account that irrigation water may contain ions that form insoluble salts or other compounds in soil that can accumulate over time. The buildup of these insoluble deposits can lead to decreased soil permeation, soil compaction, alkaline soil conditions, and reduced nutrient availability in the root zone of plants or crops in the soil. Conditions that can lead to decreased soil permeation include: (1) inorganic loading of the source water, (2) addition of fertilizers and/or soil amendments to the source water; and (3) efficiency of the irrigation water filtration system.

Embodiments of the present invention provide a method of increasing delivery of irrigation water and optionally a fertilizer to a predetermined depth in soil containing agricultural crops. Formic acid and/or a formate salt are introduced to irrigation water to form a formate-enhanced irrigation water having a formate concentration of from about 10 ppm to about 10,000 ppm. The formate-enhanced irrigation water is distributed to the soil in an amount sufficient to (i) increase a flow rate of the irrigation water through the soil, (ii) reduce a compaction of the soil, and/or (iii) reduce a calcium concentration in the soil.

Although irrigation water sources vary dramatically, they frequently contain inorganic ions, dissolved hydrogen sulfide and dissolved carbon dioxide. The presence of such constituents can lead to several fouling problems. High levels of calcium, magnesium and carbon dioxide at a basic pH (e.g., a pH of 7 to 8 or higher) can form insoluble or only slightly soluble calcium and magnesium carbonates. Under such pH conditions, iron and manganese, even at low levels, form insoluble or only slightly soluble iron and manganese oxides that have a propensity to precipitate from the water.

Most naturally-occurring water contains dissolved ions and minerals that can form insoluble salts when combined with ions in common NPK (nitrogen, phosphorus, and potassium) fertilizer formulations. For example, bicarbonate alkalinity concentrations in water exceeding about 2 meq/liter (e.g., 200 ppm as $CaCO_3$) can cause calcium carbonate precipitation. Calcium concentrations exceeding 2-3 meq/liter (e.g., 100-150 ppm as $CaCO_3$) can cause precipitates to form during the introduction of phosphate fertilizers. The solubility chart below provides an overview of inorganic anion/cation incompatibilities (that is, anions and cations that, when both are present, lead to insoluble inorganic salt formation) that can result in insoluble material accumulating in the soil, leading to compaction and decreased soil permeation.

CHART 1

Solubility Chart for Common Irrigation System Anions and Cations

| Cation | Anion | | | | | | | |
|---|---|---|---|---|---|---|---|---|
| | $Cl^-$ | $HCO_3^-$ | $OH^-$ | $NO_3^-$ | $CO_3^{-2}$ | $SO_4^{-2}$ | $S^{-2}$ | $PO_4^{-3}$ |
| $Na^+$ | S | S | S | S | S | S | S | S |
| $K^+$ | S | S | S | S | S | S | S | S |
| $NH_4^+$ | S | S | S | S | S | S | S | S |
| $H^+$ | S | S | $H_2O$ | S | $CO_2$ | S | $H_2S$ | S |
| $Ca^{+2}$ | S | SS | VSS | S | I | VSS | XXX | I |

CHART 1-continued

Solubility Chart for Common Irrigation System Anions and Cations

| | Anion | | | | | | | |
|---|---|---|---|---|---|---|---|---|
| Cation | $Cl^-$ | $HCO_3^-$ | $OH^-$ | $NO_3^-$ | $CO_3^{-2}$ | $SO_4^{-2}$ | $S^{-2}$ | $PO_4^{-3}$ |
| $Mg^{+2}$ | S | S | I | S | VSS | S | XXX | I |
| $Fe^{+2}$ | S | SS | VSS | S | VSS | S | I | I |
| $Fe^{+3}$ | S | I | I | S | I | S | XXX | I |
| $Mn^{+2}$ | S | XXX | I | S | I | S | I | I |

In Chart 1, S means soluble (over 5,000 ppm), SS means slightly soluble (2,000 to 5,000 ppm), VSS means very slightly soluble (20-2,000 ppm), I means insoluble (<20 ppm) and XXX means does not form (is not a compound). From Kemmer, Frank N., *Water: The Universal Solvent*, Basic Chemistry, p. 37, Nalco Chemical Company (1977). As seen from the solubility information in Chart 1, the addition of phosphates, such as phosphate fertilizers, to hard water (e.g., which contains calcium or magnesium ions) can lead to the formation of insoluble inorganic salts.

Fertilizers are generally defined as materials that add nutrient value to the soil that enables enhanced growth and development of a plant or crop in the soil. Soil amendments are generally defined as materials that enable the nutrients, already in the soil, to be more efficiently utilized and transported to the plant or crop being grown. Regardless of whether the material is a fertilizer or soil amendment, these additives, when added to irrigation water, can cause the accumulation of insoluble compounds, leading to soil compaction and decreased soil permeation.

These problematic fertilizer and/or soil amendment additives include inorganic materials such as: (1) various NPK (nitrogen, phosphorus, and potassium) fertilizer formulations; (2) diverse micronutrient formulations that can contain iron, zinc, or manganese, as well as other heavy metals; and (3) common inorganic soil amendments, such as calcium sulfate (e.g., gypsum) and calcium carbonate (e.g., lime). All of these additives can elevate the risk of fouling of the micro-irrigation system due to precipitation of inorganic ions. Chart 1 above provides solubility data for common cation/anion combinations to demonstrate the potential for precipitation and deposit formation. In other words, Chart 1 shows the anions and cations that, when both are present, can lead to the formation of insoluble inorganic compounds.

The compositions and methods of exemplary embodiments of the invention provide a reliable, safe, economical, and environmentally friendly approach to increasing soil permeation and delivery of irrigation water and fertilizer(s) to at least a predetermined depth into soil (e.g., a root depth of a crop or plant in the soil). The present methods and compositions may be effective for improving delivery of fertilizer(s) to soil that has been compacted due to the accumulation of one or more insoluble materials in the soil. The compositions can be formed by introducing formic acid and/or a formate salt to irrigation water to form a formate-enhanced irrigation water having a formate concentration from about 10 ppm to about 10,000 ppm. For example, the compositions may comprise formic acid or formate ion (e.g., a formate salt, such as potassium formate, ammonium formate, calcium formate or magnesium formate), which may be added (e.g., as an aqueous solution) to the irrigation water to improve soil permeation and delivery of irrigation water and fertilizers to predetermined depths into the soil.

Formic acid, which may be used alone in the practice of the invention, is commercially available. It is typically available in concentrations ranging from 20 percent to 99 percent (e.g., 30 to 95 percent) as formic acid in water. Such commercially available formic acid sources can be used as a stock solution of formic acid for use in the invention. Once formed, the formate-enhanced irrigation water may comprise an amount of formic acid and/or formate salt from about 10 parts per million (ppm) to about 10,000 ppm (e.g., by weight or by moles), or any value or range of values therein (e.g., 100-1000 ppm by weight). In some embodiments, the formate-enhanced irrigation water contains from 0.001 to 1.0 parts by weight of formic acid per 100 parts by weight of the formate-enhanced irrigation water, or any value or range of values therein.

Potassium formate can be produced as an aqueous fertilizer product as a 50.5% by weight potassium formate solution, which translates to a 0-0-28.3 NPK product in agricultural terms. A liquid 0-0-42 NPK product can also be produced, but the 0-0-28.3 NPK product has a minimal cost of production.

For a typical treatment, the formic acid stock solution and/or an aqueous formate salt solution can be added to the irrigation water at a flow rate of from about 0.1 to about 10 units volume (e.g., gallons, liters, etc.) per unit time (e.g., minute, hour, etc.) for every 1000 units volume per unit time of irrigation water. For example, the formic acid stock solution and/or aqueous formate salt solution may be introduced to the irrigation water (e.g., by pumping) at a flow rate ratio of from about 0.1 to about 10 gallons/min for every 1000 gallons/min of irrigation water being distributed to the soil. The soil to which the formic acid and/or formate salt solution is distributed is typically not the entire field served by the irrigation system, but instead, a block of the field that may encompass the acreage normally under simultaneous irrigation (typically from about 5 to about 100 acres). The optimum or near optimum flow rate ratio and length of time for distributing the formate-enhanced irrigation water to the soil (e.g., the block in the agricultural field), whereby an efficient and successful, but not impractically excessive, concentration of actives (i.e., formic acid or formate ion) is fed to the irrigation water, may depend on the water quality of the irrigation water, the compaction of the soil, the depth of the root zone in the soil, the concentration, distribution and/or depth of insoluble carbonates, bicarbonates and oxides in the soil, etc. Ultimately, in a typical application, the present method distributes from about 0.1 liters of actives per acre (0.04 l/hectare of actives) to about 50 liters of actives per acre (20 l/hectare of actives), or any value or range of values therein.

The formate-enhanced irrigation water is distributed directly to the soil, rather than through an irrigation system. The formate-enhanced irrigation water can be distributed directly to the soil by flooding the field or block with a predetermined volume of formate-enhanced irrigation water. The formic acid and/or formate salt solution may be distributed to the irrigation water at an inlet in the irrigation water supply pipe/conduit upstream from outlet in the pipe/conduit to the field or block, or at the outlet in the pipe/conduit.

To accomplish the present method, formic acid and/or a formate salt can be introduced into the irrigation system (e.g., at a manifold) just before the irrigation water conduit to the field. A typical irrigation system includes a pump that can pump water at a rate of up to approximately 1000 to 10,000 liters per minute, typically at a pressure of up to about 40 to 80 psi. The formic acid stock solution can be introduced into the water of the irrigation system via a positive displacement pump, at a rate of about 0.5 to about 40 l per minute. Such a feed rate is from about 10 ppm to about 10,000 ppm relative to the volume of irrigation water at the rate at which it is pumped. A typical block to be irrigated is about 20-50 acres. At a flow rate of, for example, 1000 l to about 15,000 l per minute of the formate-enhanced irrigation water into the field or block, the formic acid and/or formate salt may be distributed to the field or block for a length of time from about 1 to about 8 hours.

The formate-enhanced irrigation water is delivered to the soil in an amount sufficient to (i) increase a flow rate of the irrigation water through the soil, (ii) reduce a compaction of the soil, and/or (iii) reduce a calcium concentration in the soil. The flow rate of the irrigation water through the soil can be measured before and after the present method to determine the change therein. For example, the flow rate of the irrigation water through the soil can be measured according to one or more of the Examples described below.

The extent and depth of subsurface compaction in the soil can be measured using a penetrometer, or soil compaction tester (e.g., to a depth of 36 to 48 inches into the soil). Dial compaction probes can measure the pressure (e.g., in pounds per square inch) that it takes to penetrate the soil (e.g., via a needle moving across a scale on the display). Digital compaction meters are similar to dial compaction probes, but they display a digital reading of pressure and can record the depth and pressure for each test. Thus, the compaction of the soil (i.e., pressure required to penetrate the soil at a certain depth) can be measured before and after the present method to determine the change in soil compaction.

The calcium concentration in the soil can also be measured before and after the present method to determine the change therein. For example, samples of dry soil can be taken (e.g., at substantially the same site and at the same depth) before and after the present method, and a predetermined volume of water (e.g., irrigation water, tap water, distilled and/or deionized water, etc.) can be passed through the sample and collected. The calcium concentration in the water passed through the soil sample can be conventionally measured. The calcium concentrations in the water passed through the soil samples collected before and after the present method can be compared to determine the change therein as a result of the present method.

In the present method, the formate-enhanced irrigation water may leach or dissolve insoluble materials (e.g., insoluble inorganic salts) above, at or below the predetermined depth in the soil, and may decrease soil salinity and/or alkalinity within the root zone of the crops in the soil. For example, formic acid may react with carbonate salts to form calcium formate, carbon dioxide and water, and the formate salt(s) in the stock solution may exchange counterions with insoluble carbonate and bicarbonate compounds in the soil to form relatively soluble formate salts from the cations in the insoluble carbonate and bicarbonate compounds and relatively soluble carbonate and bicarbonate salts from the cation in the stock formate salt solution.

For example, the overall formic acid reaction with calcium carbonate is shown in reaction (2) below.

$$2HCOOH_{aq} + CaCO_{3s} \rightarrow Ca^{+2}_{aq} + 2(HCOO)^-_{aq} + H_2O + CO_{2g} \qquad (2)$$

Calcium formate is readily soluble in water, and can be transported out of the root zone as a dissolved eluent in excess irrigation water. Thus, the presence of formate ions in the irrigation water may also help to remove some insoluble material containing calcium ions from the soil in the root zone (or within a root depth) of the soil. Therefore, further embodiments of the present method may further include introducing formate ions, such as potassium formate, ammonium formate, or even calcium formate (in a concentration in the formate-enhanced irrigation water of <4% by weight) to the irrigation water before distributing the formate-enhanced irrigation water to the soil. Additionally, the carbon dioxide released in the soil may aid in reducing soil pH, leading to a decrease in soil compaction and a further increase in soil permeability.

It is surprising that formate salts, such as potassium formate and calcium formate, also effectively (i) increase the flow rate of the irrigation water through the soil, (ii) reduce the compaction of the soil, and (iii) reduce the calcium concentration in the soil. Due to its solubility in water, potassium formate is a particularly advantageous salt for these purposes.

Potassium formate may be made by reacting formic acid with potassium hydroxide the according to reaction (1):

$$HOC(O)H + KOH \rightarrow KOC(O)H + H_2O \qquad (1)$$

When a potassium formate manufacturer or supplier can make its own formic acid, rather than purchasing it from an external source, the cost of the potassium formate can decrease, and the availability of the potassium formate (e.g., for sale or supply to others) can increase. Such manufacturers realize several advantages, including a dramatic decrease in raw material costs, as formic acid can be relatively expensive on the open market. Formic acid also is sometimes in short supply in certain markets.

The formate anion of potassium formate, being an organic molecule, is also important. It is naturally occurring in most plants, it enhances the soil, and it is a source of nutrients for beneficial microorganisms, which are also important for growing crops. In contrast, most traditional potassium fertilizers are inorganic fertilizers, which contain non-nutrient anions (e.g., chloride, sulfate, thiosulfate, carbonate, etc.), except for potassium nitrate, which contains nitrogen.

Potassium formate, ammonium formate and alkaline earth metal formates (e.g., calcium formate and magnesium formate) made from $CO_2$ can be an essential part of regenerative farming. Instead of providing extraneous non-nutrient or potentially toxic materials (such as inorganic chlorides, carbonates, thiosulfates or other detrimental materials) to the soil, an organic carbon-based anion is fed into the soil along with the cationic nutrient. Organic species such as formate ions beneficially modify the soil structure and provide a food source and a relatively healthy environment for beneficial microorganisms to thrive.

Because of its high water solubility and hygroscopicity, potassium formate and other formate salts hold water well in the root zone of the plant. This water-holding capacity allows the formate salt to be used and applied as an aqueous material, which then contacts the roots for an extended period of time, compared to other fertilizers. Carbon in the soil, including in the form of formate anions, provides binding sites for positively charged nutrients (e.g., cations such as calcium, magnesium, sodium, and potassium). Carbon contributes to soil aggregation and structure, thereby improving root growth and mycorrhizal activity. Carbon in the form of formate anions may be best applied to the root zone of the plants or crops (e.g., through drip irrigation systems) to facilitate its benefits.

It is challenging to maintain carbon in the soil in relatively hot and arid regions (e.g., central California). Adding carbon on a continuous basis (e.g., by continuous fertigation) facilitates continuous replenishment of the soil.

In particular, aqueous potassium formate solutions retain the ionic character of the potassium and formate ions, making the nutrients much more available to the plant (and other beneficial organisms in the soil), and providing an increased efficacy of fertilizer formulations containing it. In particular, potassium formate is a useful fertilizer for relatively large-acreage crops, such as almonds, pistachios, tomatoes and grapes. It is also useful for other permanent crops and row crops. Potassium formate can be used in all micro-irrigation applications, and it formulates well with other fertilizers and formulation components in foliar applications.

Generally, one can apply less potassium formate on a $K_2O$ basis than other potassium fertilizers because of the superior solubility of potassium formate relative to other potassium fertilizers. The table below lists the solubilities of various potassium fertilizers in water (as $K_2O$) on a weight basis:

| Solubility (g $K_2O$/100 g $H_2O$) | | | | Relative Solubility (compared to $K_2SO_4$) | |
|---|---|---|---|---|---|
| Temp (°F) | 32 | 68 | 86 | 68 | 86 |
| $HCO_2K$ | 184 | 189 | 202 | 31.5 | 28.9 |
| $CH_3CO_2K$ | 104 | 123 | 136 | 20.5 | 19.4 |
| $K_2SSO_3$ | 48 | 77 | 87 | 12.8 | 12.4 |
| $KNO_3$ | 6 | 15 | 21 | 2.5 | 3.0 |
| $KHSO_4$ | 13 | 18 | 19 | 3.0 | 2.7 |
| KCl | 18 | 22 | 24 | 3.7 | 3.4 |
| $K_2SO_4$ | 4 | 6 | 7 | 1.0 | 1.0 |

FIG. 7 is a graph 300 showing the solubilities of various potassium fertilizers in water as a function of temperature, from 32° F. (0° C.) to over 190° F. (90° C.). On the graph 300, line 310 represents the solubility of potassium formate, line 320 represents the solubility of potassium acetate, line 330 represents the solubility of potassium thiosulfate, line 340 represents the solubility of potassium nitrate, line 350 represents the solubility of potassium chloride, and line 360 represents the solubility of potassium sulfate.

At all temperatures, potassium formate (line 310 in FIG. 7) is the most soluble in water of all of the potassium fertilizers shown. Potassium formate is substantially completely soluble at all concentrations of standard and/or commercial potassium-containing fertilizer formulations, thereby maximizing plant uptake and the efficiency of the potassium fertilizer at all temperatures at which the fertilizer is delivered to the crops or plants. Potassium formate is also compatible with other commercial nitrogen, phosphorous, and micronutrient fertilizers.

At temperatures in the range of 68-86° F. (20-30° C.), potassium acetate (line 320 in FIG. 7) has approximately 65% of the solubility of potassium formate in water. Like potassium formate, potassium acetate contains carbon, but it is relatively expensive compared to other potassium fertilizers, including potassium formate. Thus, due to its cost, use of potassium acetate as a fertilizer is typically limited to applications for potassium deficiency.

Potassium thiosulfate (line 330 in FIG. 7) has about 40% of the solubility of potassium formate in water at temperatures in the range of 68-86° F. (20-30° C.). Potassium thiosulfate is commonly used to treat crops and plants for potassium deficiency, and in situations when fast uptake of the potassium is desired or required. However, potassium thiosulfate can cause leaf burn and plant damage, and thus typically requires caution during application. Potassium thiosulfate is also relatively expensive in comparison with other potassium fertilizers.

Potassium nitrate (line 340 in FIG. 7) has about 9% of the solubility of potassium formate in water at temperatures in the range of 68-86° F. (20-30° C.). Potassium nitrate is a popular potassium fertilizer because it also supplies nitrogen (from the nitrate anion). Potassium nitrate is also relatively expensive in comparison with potassium chloride and potassium sulfate.

At temperatures in the range of 68-86° F. (20-30° C.), potassium chloride (line 350 in FIG. 7) has about 12% of the solubility of potassium formate in water, and is therefore slightly more soluble at temperatures typical for actual use in the field than is potassium nitrate. Potassium chloride is also inexpensive in comparison with other potassium fertilizers. However, compared to some other potassium fertilizers, aqueous solutions of potassium chloride contain a low percentage of potassium. As a result, a relatively large amount of fertilizer formulations containing potassium chloride must be delivered to the crops or plants than otherwise identical fertilizer formulations containing certain other potassium fertilizers in order to deliver the same effective amount of potassium. Furthermore, the chloride anion can be toxic to plants at sufficiently high concentrations, and chloride is also considered a pollutant by some regulatory agencies, leading to regulation of chloride released into freshwater sources.

Potassium sulfate (line 360 in FIG. 7) has about 3% of the solubility of potassium formate in water at temperatures in the range of 68-86° F. (20-30° C.), and is thus the least soluble of the potassium fertilizers in FIG. 7 and the above table. Potassium sulfate is inexpensive in comparison with other potassium fertilizers, and is therefore commonly used in large applications, such as post-harvest (e.g., banding) applications, field preparation for row crops, and applications using a "solution" machine in drip irrigation. Similar to potassium chloride, compared to some other potassium fertilizers, aqueous solutions of potassium sulfate contain a low percentage of potassium. As a result, a relatively large amount of fertilizer formulations containing potassium sulfate must be delivered to the crops or plants than otherwise identical fertilizer formulations containing certain other potassium fertilizers in order to deliver the same effective amount of potassium. Furthermore, like chloride, the sulfate anion can be toxic to plants at sufficiently high concentrations, and sulfate is considered a pollutant by some regulatory agencies.

Exemplary Methods of Making Potassium Formate Using $CO_2$ as a Starting Material Another aspect of the present invention relates to a method of making alkali metal, alkaline earth metal, and even ammonium formate salts from carbon dioxide, a hydrogen source, and an alkali metal, alkaline earth metal, or ammonia source. Typically, the method involves reacting the carbon dioxide and the hydrogen source at a temperature greater than room temperature and at a pressure greater than or equal to ambient or atmospheric pressure to make formic acid, then reacting the formic acid with the alkali metal, alkaline earth metal, or ammonia source to produce the formate salt. A preferred alkali metal is potassium, and a preferred alkaline earth metal is calcium. Use of carbon dioxide as a starting material in manufacturing alkali metal, alkaline earth metal, and ammonium formate salts also effectively removes the carbon dioxide from the environment.

In most embodiments, the alkali metal, alkaline earth metal, or ammonia source is an alkali metal hydroxide (e.g., KOH), alkaline earth metal hydroxide (e.g., Ca(OH)$_2$, or lime), or ammonium hydroxide. The hydrogen source is typically hydrogen gas (H$_2$), but other hydrogen sources may also be acceptable. For example, some catalytic processes for making formic acid from carbon dioxide (e.g., using a catalyst comprising ruthenium supported on molecular sieves) can use a small-molecular weight polyol (e.g., ethylene glycol [HOCH$_2$CH$_2$OH], propylene glycol [HOCH$_2$CH$_2$CH$_2$OH], glycerol [HOCH$_2$CH(OH)CH$_2$OH], etc.) as a hydrogen source.

Furthermore, most embodiments of the method make formic acid, either in situ (e.g., as a reactant that is subsequently reacted with the alkali metal hydroxide, alkaline earth metal hydroxide, or ammonium hydroxide without isolation and storage) or as an intermediate product. However, all embodiments of the method use carbon dioxide as a raw material or carbon (formate) source.

The method generally comprises reacting the carbon dioxide and the hydrogen source to generate formic acid (i.e., a "carbon dioxide reduction" reaction), then reacting the formic acid with the alkali metal, alkaline earth metal, or ammonia source to form the alkali metal, alkaline earth metal, or ammonium formate salt (i.e., a "formic acid neutralization" reaction). The carbon dioxide and the hydrogen source are generally reacted at a high pressure (e.g., in the range of 10-1000 atm) and/or high temperature (e.g., in the range of 50-500° C.). In some embodiments, the carbon dioxide and the hydrogen source are reacted in the presence of a catalyst, which can bring the pressure and/or temperature into the lower end of one or both of the ranges or even lower (e.g., 1-100 atm and/or 25-250° C.).

Further embodiments of the method may comprise generating the hydrogen source (e.g., hydrogen gas) electrochemically (e.g., by electrolytic splitting of water), or by steam methane reforming (SMR), which can also produce the carbon dioxide. Alternatively or additionally, the method may further comprise obtaining the carbon dioxide from the atmosphere, from one or more carbon dioxide-producing processes, or from incineration (e.g., of biomass or carbon-containing waste, or in a process to generate electricity).

In even further embodiments, either or both of (1) reacting the carbon dioxide and the hydrogen source to generate formic acid and (2) reacting the formic acid with the alkali metal, alkaline earth metal, or ammonia source may be continuous, and the formic acid may be reacted with the alkali metal, alkaline earth metal, or ammonia source without isolating or storing the formic acid after its generation (e.g., in the first step of the overall method). In other or further embodiments, the method may further comprise storing an excess of the hydrogen source (e.g., hydrogen gas) from the reaction with the carbon dioxide in a hydrogen fuel cell. Thereafter, the stored hydrogen source in the fuel cell can be converted into electricity, or recovered and reused (e.g., recycled) in the reaction with the carbon dioxide.

More particularly, in a first embodiment of the method of making a formate salt, carbon dioxide and hydrogen are reacted (e.g., in a carbon dioxide reduction reaction) to generate formic acid according to reaction (2) below:

$$CO_2 + H_2 \rightarrow HC(O)OH \qquad (2)$$

This reaction can be catalyzed. For example, a wide variety of ruthenium and rhodium catalysts can reduce carbon dioxide for formic acid using hydrogen, both homogeneously and heterogeneously. Complexes of ruthenium and rhodium (particularly ruthenium) with various phosphine, amine, heterocyclic and N-heterocyclic carbene ligands can catalyze the homogeneous reaction of carbon dioxide and hydrogen to formic acid relatively selectively, without significant formation of carbon monoxide. Other catalysts, such as copper/copper chromite (Cu/CuCr$_2$O$_4$), palladium-doped nickel on an aluminum layered double hydroxide (e.g., Ni with 0.1-1.0 mol % or wt. % Pd in Ni on an Al LDH), manganese complexes with multi-dentate phosphine and/or amine ligands, and certain iron and cobalt complexes containing carbonyl, phosphine and halide ligands can also homogeneously catalyze the reduction of carbon dioxide with hydrogen. The reaction using the Pd-doped Ni on Al LDH catalyst is facilitated by being conducted in a basic medium (e.g., in an aqueous acetate buffer, or in the presence of a trialkylamine, N-methyl diethanolamine, or a basic amino acid such as lysine or arginine). The reaction catalyzed with such homogeneous catalysts can be conducted at temperatures of 30-200° C. or any temperature or range of temperatures therein (e.g., 80-150° C.), and at pressures typically in the range of 20-200 atm or any pressure or range of pressures therein (e.g., 40-100 atm). The ratio of the partial pressure of carbon dioxide to the partial pressure of hydrogen in this reaction can be from 1:1 to 1:5, or any ratio or range of ratios therein.

Ruthenium and rhodium complexes such as those described in the preceding paragraph, alone or in combination with elemental ruthenium or rhodium, can be conventionally supported on a carrier such as molecular sieves, an LDH or silica, then used to react carbon dioxide with hydrogen heterogeneously to form formic acid. Such heterogeneous catalysis can be conducted at temperatures of 80-300° C. or any temperature or range of temperatures therein, and at pressures typically in the range of 2-200 atm or any pressure or range of pressures therein. The ratio of the partial pressure of carbon dioxide to the partial pressure of hydrogen in this reaction can also be from 1:1 to 1:5, or any ratio or range of ratios therein. The heterogeneously catalyzed reaction may be conducted in a closed vessel, with additional carbon dioxide and hydrogen introduced into the vessel to maintain a target pressure, or in an "open" reactor, in which the carbon dioxide and hydrogen are flowed over a bed or other structure on which the catalyst is fixed. In the latter, the flow rates of carbon dioxide and hydrogen can be selected such that the reaction rate is within 10-50% of a maximum reaction rate for the catalyst, on the bed or other structure, in the vessel at the temperature of the reaction.

The formic acid can be conventionally isolated from the reaction mixture and/or conventionally purified, as desired.

The formic acid that is produced is then reacted with the alkali metal, alkaline earth metal, or ammonium hydroxide to produce the formate salt according to reaction (3):

$$n \cdot HOC(O)H + M^{+n}(OH)_n \rightarrow M^{+n}(^-OC(O)H)_n + n \cdot H_2O \qquad (3)$$

where M is the alkali metal, the alkaline earth metal, or an ammonium ion, and n is the formal charge on M (i.e., 1 or 2).

In one embodiment, a concentrated aqueous solution of the alkali metal, alkaline earth metal, or ammonium hydroxide is reacted with the formic acid in a high-volume, optionally cooled batch reactor (e.g., a so-called neutralization reactor), equipped with one or more stirrers or mixers. The reactor may have a volume of 1000 liters or more (e.g., ≥10,000 liters, ≥25,000 liters, etc., up to 100,000 liters, 250,000 liters, or more). The formic acid may be introduced into the batch reactor as an aqueous solution (e.g., containing 1-50 wt. % of water), but since the reaction produces 1 mol of water for each mol of formic acid consumed, the water added to the formic acid prior to reaction with the alkali metal, alkaline earth metal, or ammonium hydroxide may be minimized to minimize the amount of water in the formate salt (e.g., to either be removed from or transported with in the formate salt).

Alternatively, the alkali metal, alkaline earth metal, or ammonium hydroxide is reacted with the formic acid in a continuous reactor. The alkali metal, alkaline earth metal, or ammonium hydroxide may be introduced into the continuous reactor as a concentrated aqueous solution, and the formic acid may be introduced into the continuous reactor neat or as an aqueous solution (e.g., containing 1-50 wt. % of water), but for the same reasons given in the previous paragraph, the amount of water added to the formic acid may be minimized. The continuous reactor may also be conventionally cooled to control the temperature of the neutralization reaction (which is relatively exothermic).

In a further embodiment, the formic acid may be reacted directly with the alkali metal, alkaline earth metal, or ammonium hydroxide in a continuous or substantially continuous process, thereby simplifying the present method and making it even more economical. This embodiment can be represented by reaction (4):

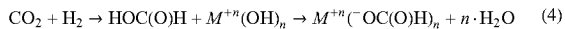

$$CO_2 + H_2 \rightarrow HOC(O)H + M^{+n}(OH)_n \rightarrow M^{+n}(^-OC(O)H)_n + n \cdot H_2O \quad (4)$$

For example, when the formic acid is made by homogeneous catalysis, the reaction may be conducted in a water-insoluble or substantially water-insoluble organic solvent (e.g., an aliphatic and/or aromatic hydrocarbon solvent), and after conventional removal of the catalyst, the formic acid can be extracted with water, then introduced directly (e.g., without further isolation or purification) into the neutralization reactor, or extracted directly with an aqueous solution of the alkali metal, alkaline earth metal, or ammonium hydroxide (optionally with cooling). Alternatively, when the formic acid is made by heterogeneous catalysis, the reaction product (formic acid) may be transported directly to an inlet of the neutralization reactor. In a further embodiment, the formic acid made by heterogeneous catalysis can be cooled or condensed during transportation to the neutralization reactor.

A further embodiment of the method may further comprise using a co-reactant (e.g., in addition to the catalyst) that lowers the activation energy of the reaction or otherwise creates favorable thermodynamics for the reaction, which may allow for a lower reaction temperature and/or pressure. Such an embodiment can be represented by reaction (5):

$$CO_2 + H_2 + Co\text{-reactant} \rightarrow HOC(O)H * Co\text{-reactant} \quad (5)$$

The co-reactant can be, for example, an organic base, such as a mono-, di- or tri-($C_1$-$C_6$)-alkylamine. Each alkyl group can be further substituted with a hydroxyl, amino or mono- or di-($C_1$-$C_6$)-alkylamino group. Such a co-reactant can be used advantageously in the synthesis of formic acid by homogeneous catalysis. As the formic acid is formed, it can react with the organic base by neutralization to form an intermediate salt or adduct having the form "HOC(O)H*co-reactant." The neutralization reaction can be thermodynamically very favorable, effectively making the formic acid synthesis reaction irreversible. In fact, the heat released from the neutralization reaction can reduce the amount of external heat needed for the carbon dioxide reduction reaction. When the homogeneous catalysis is conducted in a water-insoluble or substantially water-insoluble organic solvent (as described herein), the intermediate salt/adduct can be extracted periodically or continuously with water.

In this case, the formate*co-reactant intermediate product (e.g., the intermediate salt/adduct) may be separated and then reacted with MOH as shown in reaction (6):

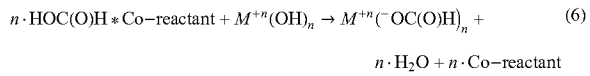

$$n \cdot HOC(O)H * Co\text{-reactant} + M^{+n}(OH)_n \rightarrow M^{+n}(^-OC(O)H)_n + \quad (6)$$
$$n \cdot H_2O + n \cdot Co\text{-reactant}$$

where M and n are as described herein. As shown in reaction (6), the alkali metal, alkaline earth metal, or ammonium hydroxide base liberates the co-reactant, which can be conventionally recovered and recycled for use in a further reaction (see reaction (5) above).

Advantageously, the process for making formic acid that uses carbon dioxide as one of the raw materials can provide a "Green Benefit." The carbon dioxide to be used in the process for making formic acid can utilize waste carbon dioxide from an industrial process (which is often emitted into the atmosphere presently), or carbon dioxide sequestered and removed from the atmosphere. Either way, the usage of carbon dioxide in processes for making formic acid and ammonium, alkali metal or alkaline earth metal formate salts can be approximated to understand the "Green Benefit." For example, in a process for making formic acid from carbon dioxide, the carbon dioxide usage would be 0.96 tons of $CO_2$ per 1.0 ton of 100% formic acid. In in a process for making potassium formate from carbon dioxide, the carbon dioxide usage is 0.52 tons of $CO_2$ per 1.0 ton of 100% potassium formate. When the potassium formate is viewed as $K_2O$ (as all potassium fertilizers are in agriculture), the carbon dioxide usage is 0.93 tons of $CO_2$ per ton of $K_2O$.

Thus, almost 1 ton of $CO_2$ is consumed for every ton of $K_2O$ that is produced in a process for making potassium formate from $CO_2$. This is extremely beneficial for removing carbon dioxide from the environment and converting it into a beneficial fertilizer. Potassium formate made from $CO_2$ can provide substantial carbon credits because of its removal of carbon dioxide from the environment. This gives the potassium formate manufacturer (and their distributors and resellers) a significant market advantage. For example, growers that incorporate such potassium formate into their regenerative farming practices can sell their agricultural products and/or commodities to retailers who increasingly demand these practices (e.g., Walmart, Target, Costco, and Pepsico, among others).

Thus, another aspect of the present invention concerns a method of generating a carbon credit, comprising making a formate salt (e.g., by the method of making a formate salt described herein), and verifying that the formate salt includes the carbon dioxide to generate the carbon credit. To generate a standard or commercially-recognized carbon credit, at least 1000 kg of the carbon dioxide used to make the formic acid is verified to be in the formate salt. The formate salt may be potassium formate, but this aspect of the invention is equally applicable to other formate salts, such as sodium formate, lithium formate, calcium formate, and ammonium formate.

Verifying that the formate salt includes the carbon dioxide may further include requesting a registry to verify that the formic acid or the formate salt includes at least 1000 kg (or a positive integer multiple of 1000 kg) of the carbon dioxide. For the registry to perform the verification, the requester (e.g., the formic acid or formate salt manufacturer) may first register the method of making the formic acid or the formate salt as a carbon credit project with the registry. When the registry verifies that the formic acid or the formate salt includes at least 1000 kg (or a positive integer multiple thereof) of the carbon dioxide, the registry may issue the carbon credit(s), and the requester may receive the carbon credit(s) from the registry.

The method may further comprise selling the carbon credit in a market, such as a voluntary market or a compliance market. After the carbon credit is sold in the market, the method may further comprise retiring the carbon credit and/or taking the carbon credit as a carbon offset. For example, after a purchaser purchases the carbon credit, the purchaser may retire the carbon credit and take the carbon credit as a carbon offset.

Examples of Soil Loosening Using Formic Acid and Aqueous Formate Salt Solutions

The following examples or provided for explanatory purposes only and are not intended to limit the scope of the invention.

Permeation tests were conducted using multiple 2-inch diameter polyvinylchloride (PVC) columns packed with 100 grams of dry farm soil ground to a fine powder having a consistent particle size. The soil was packed in each of six columns by vibration for 30 seconds, resulting in an approximately 1- to 2-inch-tall column of soil. A 1- to 2-inch-tall pad of glass beads was placed on each of the soil columns, and 100 milliliters of (1) irrigation water without formate or formic acid (i.e., water as provided to the farm by the local water bureau or irrigation organization), (2) the same water containing 22 ppm by moles of calcium formate, or (3) the same water containing 0.33% by weight of formic acid was added to each of two of the columns and passed through the respective column. In essence, the soil acts similarly to an ion exchange medium in the permeation tests. The liquid passing through the column for each of the water, water with calcium formate, and water with formic acid was collected and weighed every 10 minutes for the first hour, then every 30 minutes until substantially all of the liquid had eluted. The weights were recorded and plotted on a bar graph. After substantially all of the solution had eluted from the soil, a sample was analyzed by inductively coupled plasma optical emission spectrometry (ICP-OES) to determine the content of certain elements in the eluent. The procedure was repeated using the same soil columns until a total of four batches of 100 g of the test solutions were passed through the soil columns (i.e., each column through which irrigation water was passed on the first pass had three more 100 g samples of irrigation water passed through them; each column through which calcium formate solution was passed on the first pass had three more 100 g samples of the same calcium formate solution passed through them; and each column through which the formic acid solution was passed on the first pass had three more 100 g samples of the same formic acid solution passed through them). Results of the first two passes of the liquid through the columns are illustrated in FIGS. 1-2.

The objective was to investigate the behavior of different irrigation water treatments and determine the relative amounts of water that passed through the soil columns. The column retention times reflect the rate at which the liquid passes through the soil. Understanding these retention times provides insights about the transport and movement of irrigation water (and any fertilizers dissolved therein) through the soil, which has implications for the volume of water passing into and through the root zone, nutrient availability to crops, leaching of contaminants, and overall soil health.

FIG. 1 shows the averages of the permeation tests for irrigation water (left bar), aqueous calcium formate (center bar), and aqueous formic acid (right bar) during a first pass through dry soil from a first farm in the central San Joaquin Valley in California. The soil samples retained on average about 36 ml of liquid from the aqueous calcium formate and aqueous formic acid solutions, and about 38 ml of tap water. Furthermore, the aqueous formic acid solution had completed passing through the soil column on average between 120 and 150 minutes; the aqueous calcium formate solution had completed passing through the soil column on average between 150 and 180 minutes; and the tap water had completed passing through the soil column on average between about 240 and 270 minutes, never quite passing as much liquid through the soil column as the aqueous calcium formate and aqueous formic acid solutions. Comparing amounts of liquid passed through the columns at the same lengths of time, greater amounts of aqueous calcium formate and aqueous formic acid solutions passed through the columns than tap water at all times after 20 minutes, and more aqueous formic acid solution passed through the columns than aqueous calcium formate solution from about 30 minutes to about 150 minutes.

Figure 2:
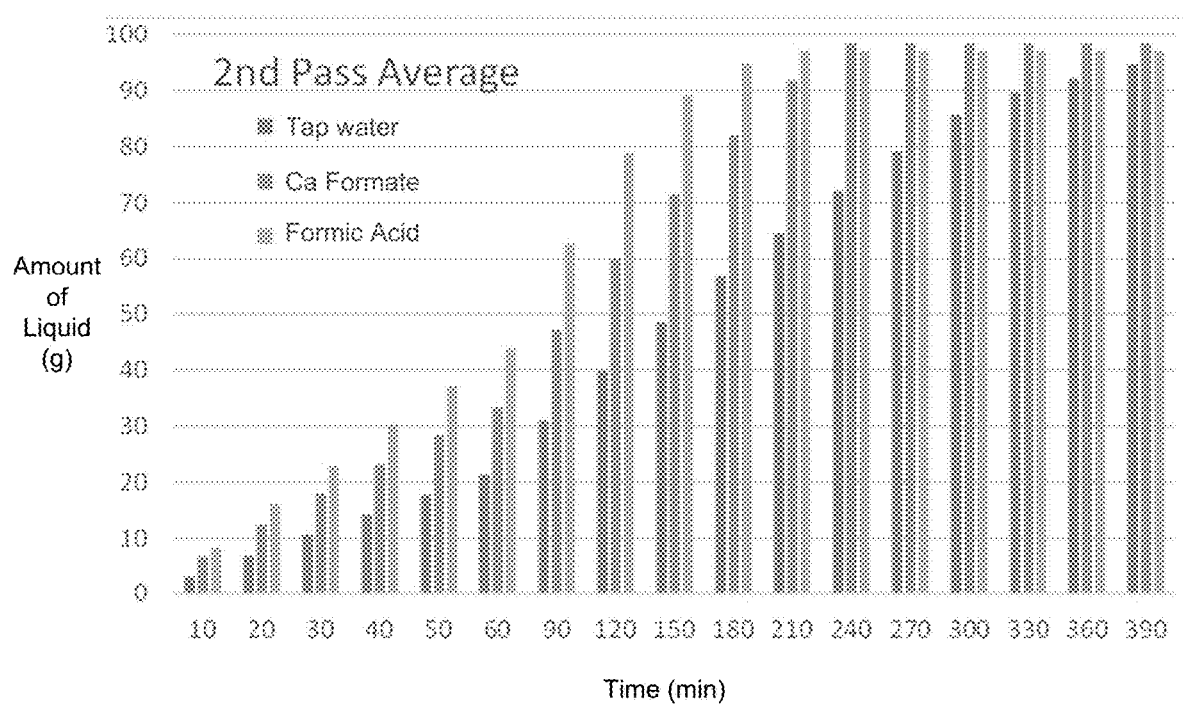
FIG. 2 is a bar graph showing results for a second pass soil permeation test through the first soil sample, comparing one or more embodiments of the invention with one or more prior approaches.

FIG. 2 shows the averages of the permeation tests for tap water (left bar), aqueous calcium formate (center bar), and aqueous formic acid (right bar) during a second pass through the same soil columns from the first farm providing the data for FIG. 1. Because the soil samples were wet in the second pass, a greater percentage of the 100 ml of liquid added to the columns passed through the columns. Similar to the results in FIG. 1, the aqueous formic acid solution had completed passing through the soil column on average between 180 and 210 minutes, and the aqueous calcium formate solution had completed passing through the soil column on average between 210 and 240 minutes. However, even after 390 minutes, the tap water may not have completed passing through the soil column. Comparing amounts of liquid passed through the columns at the same lengths of time, greater amounts of aqueous calcium formate and aqueous formic acid solutions passed through the columns than tap water at all times, and more aqueous formic acid solution passed through the columns than aqueous calcium formate solution at all times up to about 240 minutes.

The results of the third and fourth passes were similar to the second pass (FIG. 2), except that the formic acid solution completely eluted a little earlier, and the results of the calcium formate solution and irrigation water gradually became more similar, while the results of the formic acid solution continuously improved. Table 1 below shows the elution results, in which the first column of data shows the average time taken for 50 g of the test solution to pass through the soil for each of the four passes, and the last three data columns show the average amount of liquid (in grams) eluted from each individual column after 60 minutes, 120 minutes and 240 minutes. "Water" refers to irrigation water, "Ca formate" refers to the calcium formate solution, and "HCO₂H" refers to the formic acid solution; "1st" refers to the first pass, "2nd" refers to the second pass, etc.; NA indicates "not applicable" as all the water eluted before 240 minutes. The data in Table 1 is for the average of the two soil samples.

TABLE 1

| Sample | Time (50 g of liquid, in min) | Liquid Eluted after 60 min (in g) | Liquid Eluted after 120 min (in g) | Liquid Eluted after 240 min (in g) |
|---|---|---|---|---|
| Water 1$^{st}$ | 180 | 15.9 | 35.5 | 60.4 |
| Water 2$^{nd}$ | 180 | 21.3 | 39.9 | 72.1 |
| Water 3$^{rd}$ | 180 | 19.1 | 36.2 | 66.3 |
| Water 4$^{th}$ | 180 | 19.6 | 37.9 | 68.5 |
| Ca formate 1$^{st}$ | 120 | 28.6 | 53.9 | NA* |
| Ca formate 2$^{nd}$ | 120 | 33.3 | 59.9 | 98.5 |
| Ca formate 3$^{rd}$ | 150 | 26.4 | 48.8 | 86.7 |
| Ca formate 4$^{th}$ | 150 | 24.1 | 44.6 | 75.0 |
| HCO₂H 1$^{st}$ | 90 | 34.1 | 59.7 | NA* |
| HCO₂H 2$^{nd}$ | 90 | 43.9 | 78.9 | NA* |
| HCO₂H 3$^{rd}$ | 90 | 36.0 | 68.3 | NA* |
| HCO₂H 4$^{th}$ | 90 | 40.5 | 69.5 | NA* |

The elution results show that the calcium formate solution passed through the column more quickly than the irrigation water, for all four passes. This can also be seen from the drainage rates (Table 2), where the amount of time for 50 g of the calcium formate solution to elute from the soil took 67% to 83% of the time of the irrigation water tests (i.e. 17% to 33% faster drainage rate). In terms of the amount of liquid eluted from the soil over fixed periods of time (60 mins, 120 mins and 240 mins), the calcium formate solution provides an 110-180% improvement compared to the irrigation water.

Repeated application of the calcium formate solution to the same soil column results in a significant improvement in drainage rate for the first pass relative to irrigation water, and the second pass with the calcium formate solution elutes much faster than the first pass. However, the third pass with the calcium formate solution elutes a little more slowly than the second pass (similar to the first pass), and the fourth pass elutes slowest of all, but still faster than the irrigation water. This result suggests that repeated applications of the calcium formate solution initially improves the drainage rate of the soil, then at some point it starts to decrease the drainage rate, although the drainage is still much better than when irrigation water is used alone. This may be related to a buildup of calcium in the soil during or after the third application of the calcium formate solution. This observation will be discussed further in relation to the ICP results presented below.

The formic acid solution showed the best performance. This solution passed through the soil significantly faster than the irrigation water or the calcium formate solution (FIGS. 1-2 and Table 1). The drainage rates presented in Table 2 below show that the formic acid solution elutes 170-210% more liquid by mass than the irrigation water in the first pass, 200-210% more in the second pass, ~190% more in the third pass, and 180-210% more in the fourth pass.

TABLE 2

Drainage Rates, showing the same results as presented in Table 1 but presented as percentages relative to irrigation water.

| Sample | Time (50 g), in min | 60 mins (g) | 120 mins (g) | 240 min (g) |
|---|---|---|---|---|
| Ca formate 1st | 66.7% | 180% | 152% | NA* |
| Ca formate 2nd | 66.7% | 157% | 150% | 137% |
| Ca formate 3rd | 83.3% | 138% | 135% | 131% |
| Ca formate 4th | 83.3% | 123% | 118% | 110% |
| HCO2H 1st | 50.0% | 214% | 168% | NA* |
| HCO2H 2nd | 50.0% | 206% | 198% | NA* |
| HCO2H 3rd | 50.0% | 189% | 189% | NA* |
| HCO2H 4th | 50.0% | 207% | 183% | NA* |

The results from the ICP analyses of the solutions that passed through the soil columns are presented in Table 3 below, in ppm. Results are presented from each individual test (i.e., each test solution was studied in duplicate, rather than presenting an average of the two side-by-side tests), where "Water A 1st" refers to the first pass with irrigation water for the first soil column, and "Water B 1st" refers to the first pass with irrigation water for the second (duplicate) soil column. The irrigation water was also analyzed by ICP as received (see the first row of data, labelled "Water"). The elements Al, As, Cd, Co, Cr, Cu, Fe, Mo, Ni, Pb, Se, Ti, and Zn were also analyzed by ICP, but are not reported, as they were found to be present at concentrations of less than 1.0 ppm.

TABLE 3

| | B | Ca | K | Mg | Mn | Na | P | S | Si |
|---|---|---|---|---|---|---|---|---|---|
| Water | 0.26 | 14.2 | 2.21 | 6.6 | 0.03 | 10.1 | <LLD | 2.1 | 10.0 |
| Water A 1$^{st}$ | 5.43 | 150.9 | 10.16 | 59.6 | 1.92 | 86.2 | 0.33 | 112.1 | 25.8 |
| Water A 2$^{nd}$ | 2.96 | 26.5 | 4.69 | 10.1 | 0.12 | 36.6 | 0.61 | 27.8 | 25.8 |
| Water A 3$^{rd}$ | 1.35 | 13.7 | 3.91 | 5.0 | <LLD | 26.1 | 0.65 | 8.4 | 24.8 |
| Water A 4$^{th}$ | 0.98 | 16.9 | 4.29 | 6.2 | 0.08 | 24.9 | 0.56 | 6.8 | 22.9 |
| Water B 1$^{st}$ | 4.84 | 149.0 | 10.71 | 56.9 | 1.89 | 83.3 | 1.14 | 112.7 | 25.2 |
| Water B 2$^{nd}$ | 2.86 | 22.0 | 5.01 | 7.3 | 0.27 | 31.7 | 1.98 | 21.8 | 28.7 |
| Water B 3$^{rd}$ | 1.34 | 13.9 | 4.02 | 4.6 | 0.04 | 24.5 | 1.58 | 11.3 | 24.8 |
| Water B 4$^{th}$ | 0.80 | 12.2 | 3.87 | 4.1 | 0.03 | 21.5 | 1.06 | 6.2 | 22.3 |
| Ca formate A 1$^{st}$ | 4.35 | 135.1 | 10.81 | 53.6 | 1.95 | 82.3 | 0.45 | 99.1 | 26.5 |
| Ca formate A 2$^{nd}$ | 2.41 | 26.6 | 5.69 | 10.4 | 0.19 | 36.8 | 0.40 | 21.2 | 25.2 |
| Ca formate A 3$^{rd}$ | 1.74 | 21.1 | 6.01 | 8.2 | 0.16 | 32.7 | 0.68 | 13.9 | 28.4 |
| Ca formate A 4$^{th}$ | 0.69 | 15.0 | 5.09 | 5.9 | 0.05 | 21.6 | 0.56 | 5.3 | 22.3 |
| Ca formate B 1$^{st}$ | 4.97 | 142.4 | 11.82 | 56.4 | 2.09 | 88.9 | 0.36 | 103.0 | 27.6 |
| Ca formate B 2$^{nd}$ | 2.40 | 25.2 | 5.73 | 9.8 | 0.22 | 38.2 | 0.41 | 19.6 | 26.2 |
| Ca formate B 3$^{rd}$ | 1.48 | 19.4 | 5.41 | 7.6 | 0.06 | 31.1 | 0.58 | 13.0 | 26.2 |
| Ca formate B 4$^{th}$ | 0.73 | 15.9 | 5.06 | 6.0 | 0.04 | 22.9 | 0.56 | 5.5 | 22.7 |

TABLE 3-continued

|  | B | Ca | K | Mg | Mn | Na | P | S | Si |
|---|---|---|---|---|---|---|---|---|---|
| HCO2H A $1^{st}$ | 4.34 | 268.8 | 19.52 | 107.6 | 4.40 | 111.2 | 1.06 | 83.5 | 31.3 |
| HCO2H A $2^{nd}$ | 2.42 | 173.7 | 15.36 | 69.7 | 3.32 | 53.9 | 1.01 | 22.8 | 34.1 |
| HCO2H A $3^{rd}$ | 2.09 | 167.8 | 14.81 | 66.6 | 5.00 | 36.5 | 1.09 | 13.4 | 46.9 |
| HCO2H A $4^{th}$ | 0.79 | 130.3 | 13.34 | 50.6 | 4.46 | 16.6 | 1.33 | 3.7 | 34.1 |
| HCO2H B $1^{st}$ | 4.25 | 261.2 | 18.52 | 103.1 | 4.25 | 109.8 | 0.55 | 74.5 | 30.9 |
| HCO2H B $2^{nd}$ | 2.41 | 205.0 | 17.82 | 79.2 | 3.98 | 49.3 | 0.73 | 22.1 | 40.9 |
| HCO2H B $3^{rd}$ | 1.82 | 176.4 | 16.46 | 67.2 | 5.23 | 31.2 | 0.90 | 11.5 | 49.9 |
| HCO2H B $4^{th}$ | 0.73 | 140.7 | 15.64 | 52.5 | 4.84 | 16.4 | 1.63 | 3.6 | 35.3 |

Figure 3:
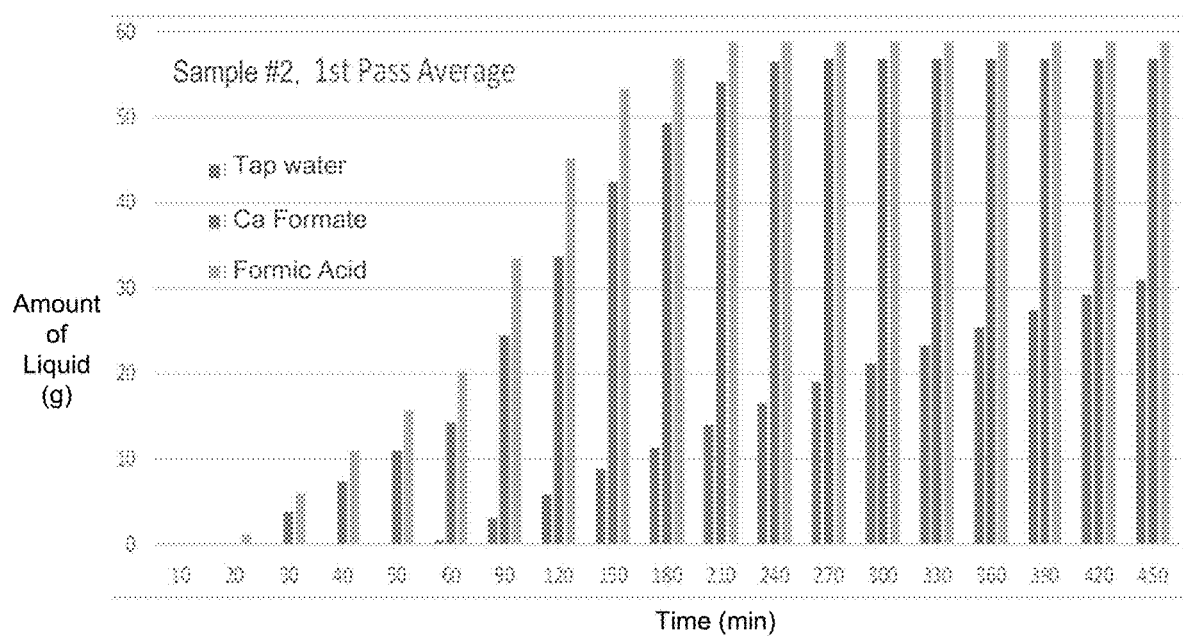
FIG. 3 is a bar graph showing results for a first pass soil permeation test through a second soil sample, comparing one or more embodiments of the invention with one or more prior approaches.
Figure 4:
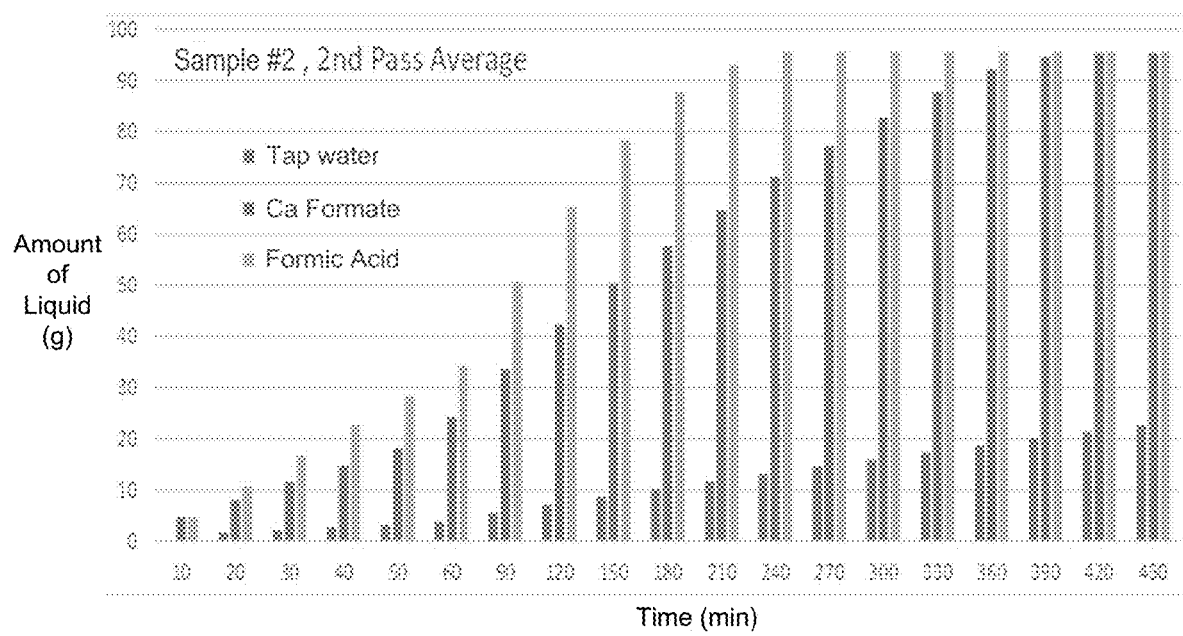
FIG. 4 is a bar graph showing results for a second pass soil permeation test through the second soil sample, comparing one or more embodiments of the invention with one or more prior approaches.

FIGS. 3-4 show results for the same permeation tests run on soil at a second farm in the central San Joaquin Valley in California, using the same liquid sources, except that the calcium formate solution contained about 25 ppm of calcium formate by moles. The irrigation water at the second farm was from a different source than the first farm. The results in FIGS. 3-4 are considerably more striking than the results in FIGS. 1-2. On the first pass, using dry soil (FIG. 3), the soil samples retained on average about 41-42 ml of liquid from the aqueous formic acid solution, and about 43-44 ml of liquid from the aqueous calcium formate solution. The amount of irrigation water ultimately retained by the soil samples was not determined. Furthermore, the aqueous formic acid solution had completed passing through the soil column on average between 180 and 210 minutes; the aqueous calcium formate solution had completed passing through the soil column on average at about 240 minutes; and the irrigation water never completed passing through the soil column after 450 minutes. Comparing amounts of liquid passed through the columns at the same lengths of time, more than three times as much aqueous calcium formate and aqueous formic acid solutions passed through the columns than irrigation water at all times from 20-30 minutes (when liquid first appeared from the columns) up to 240 minutes, and more aqueous formic acid solution passed through the columns than aqueous calcium formate solution at all times after the first appearance of liquid from the columns. The differences in "first appearance" times is also striking. Aqueous formic acid solution first appeared from the columns on average before 20 min.; aqueous calcium formate solution first appeared from the columns on average between 20 and 30 min.; but irrigation water did not appear from the columns on average until nearly 60 min.

On the second pass (wet/damp soil from the second farm, FIG. 4), the aqueous formic acid solution had completed passing through the soil column on average between 210 and 240 minutes, and the aqueous calcium formate solution had completed passing through the soil column on average by about 390 minutes. However, even after 450 minutes, only about one-fourth of the volume of irrigation water passed through the soil column as the aqueous formic acid and calcium formate solutions. Comparing amounts of liquid passed through the columns at the same lengths of time, greater amounts of aqueous calcium formate and aqueous formic acid solutions passed through the columns than irrigation water at all times, and more aqueous formic acid solution passed through the columns than aqueous calcium formate solution from 20 minutes up to about 390-420 minutes. It is not understood why the wet soil columns retained a greater volume of irrigation water than the dry columns.

During the permeation tests, formic acid routinely exhibited the shortest column retention times and the greatest flow-through volumes per unit time. This may be attributed to acidic interactions with soil particles and possibly dissolving water-insoluble salts in the soil, promoting faster movement of the liquid through the column. Irrigation water consistently displayed the longest column retention times and the smallest flow-through volumes per unit time. Movement of the irrigation water through the soil was relatively slow compared to both the formic acid and calcium formate solutions.

Comparing the first through fourth passes for each test solution, each subsequent elution of irrigation water took longer. In fact, the tests eventually took so long that a fourth pass was not run. For the calcium formate solution, the second pass eluted more quickly than the first pass, and the third and fourth passes took longer than the second pass (similar to the first pass). Taking into account uncertainty in the data, the first, third and fourth passes of the calcium formate solution show similar behavior, with the second pass showing a marked increase in drainage through the soil compared to the other passes. For the formic acid solution, the elution rate increased from the first to the third passes, with the fourth pass eluting slightly more slowly than the second and third passes, but still faster than the first pass.

A fourth experiment was run in which the formic acid and calcium formate solutions were alternated (first pass: formic acid; second pass: calcium formate; third pass: formic acid; fourth pass: calcium formate). The results were similar to the formic acid solution tests, although the fourth pass (calcium formate solution) eluted more quickly than the fourth pass for the formic acid solution only. This indicates that applying calcium formate solution to the soil between applications of formic acid solution improves the drainage through the soil, compared to using the formic acid solution alone. The improvement becomes more significant with repeated applications.

The differences in column retention times have practical implications in agricultural and environmental contexts. In agriculture, understanding the movement of water and nutrients through the soil is crucial for optimizing irrigation practices and nutrient management. Thus, adequate water and nutrient delivery to a predetermined root depth can be facilitated by introducing formic acid into irrigation water in the amounts described herein.

The results from the ICP and flow injection (FIA) analyses of the solutions that passed through the soil columns at the end of each pass are presented in Table 4 below, in ppm. FIA was used to determine the content of the listed anion (e.g., $NO_3$, Cl, $PO_4$, etc.). The same analyses on the irrigation water in these experiments is shown in Table 5. Results are presented from a single soil sample. The elements Al, As, Cd, Co, Cr, Cu, Fe, Mn, Ni, Pb, Se, Ti, and Zn were found to be present at concentrations of less than 1.0 ppm, and are therefore not reported or discussed.

TABLE 4

| Sample | B | Ca | K | Mg | Na | P | S | Si | NO3⁻ | Cl⁻ |
|---|---|---|---|---|---|---|---|---|---|---|
| Water-1st | 0.4 | 38.7 | 2.8 | 9.7 | 96.3 | 1.9 | 31.6 | 45.0 | 4.6 | 193.5 |
| Water-2nd | 0.4 | 39.9 | 3.1 | 10.2 | 99.2 | 2.2 | 34.2 | 34.6 | 0.0 | 5.7 |
| Water-3rd | 0.2 | 10.0 | 1.3 | 2.3 | 46.9 | 2.7 | 4.6 | 30.5 | 0.0 | 1.0 |
| Water-4th | na | na | na | na | na | na | na | na | na | na |
| Ca formate-1st | 0.5 | 76.1 | 4.5 | 19.6 | 169.0 | 1.0 | 51.4 | 26.3 | 0.0 | 288.0 |
| Ca formate-2nd | 0.3 | 24.0 | 2.5 | 6.1 | 110.4 | 1.1 | 14.8 | 26.9 | 0.0 | 92.1 |
| Ca formate-3rd | 0.2 | 21.7 | 2.4 | 5.5 | 96.4 | 1.0 | 10.3 | 24.3 | 0.0 | 91.9 |
| Ca formate-4th | 0.2 | 30.4 | 2.4 | 7.5 | 95.4 | 0.9 | 10.1 | 23.3 | 0.0 | 93.6 |
| HCO2H-1st | 0.6 | 260.7 | 9.7 | 69.3 | 345.5 | 0.7 | 43.8 | 31.8 | 0.0 | 304.0 |
| HCO2H-2nd | 0.5 | 312.7 | 9.0 | 81.3 | 175.2 | 1.9 | 11.4 | 43.1 | 0.0 | 102.8 |
| HCO2H-3rd | 0.4 | 337.4 | 9.9 | 84.0 | 79.9 | 5.8 | 8.0 | 51.9 | 0.0 | 91.7 |
| HCO2H-4th | 0.3 | 286.6 | 10.6 | 65.5 | 66.1 | 6.4 | 8.3 | 65.2 | 0.0 | 92.9 |
| Alternating-1st | 0.6 | 264.9 | 9.6 | 70.4 | 350.4 | 0.7 | 44.3 | 32.1 | 0.0 | 327.4 |
| Alternating-2nd | 0.4 | 151.4 | 5.7 | 39.1 | 144.5 | 1.2 | 12.7 | 36.9 | 0.0 | 95.4 |
| Alternating-3rd | 0.3 | 199.9 | 6.6 | 50.8 | 85.7 | 2.0 | 8.7 | 32.4 | 0.0 | 89.7 |
| Alternating4th | 0.2 | 173.4 | 6.0 | 43.1 | 61.4 | 3.1 | 9.0 | 44.0 | 0.0 | 94.3 |

TABLE 5

| pH | EC dS/m | Ca | Mg | Na | Cl | SO₄ (SP) meq/L | NO₃—N | PO₄—P | K | SO₄—S | Zn | Mn | Fe | Cu | B |
|---|---|---|---|---|---|---|---|---|---|---|---|---|---|---|---|
| — | | | | | | | | | | ppm | | | | | |
| 6.7 | 0.9 | 2.9 | 1.3 | 5.0 | 3.7 | 2.5 | <5.0 | 23 | 229 | 65 | 4.4 | 11.8 | 24.5 | 1.5 | 0.21 |

Exemplary Irrigation or Fertigation Apparatuses and Methods

Figure 5:
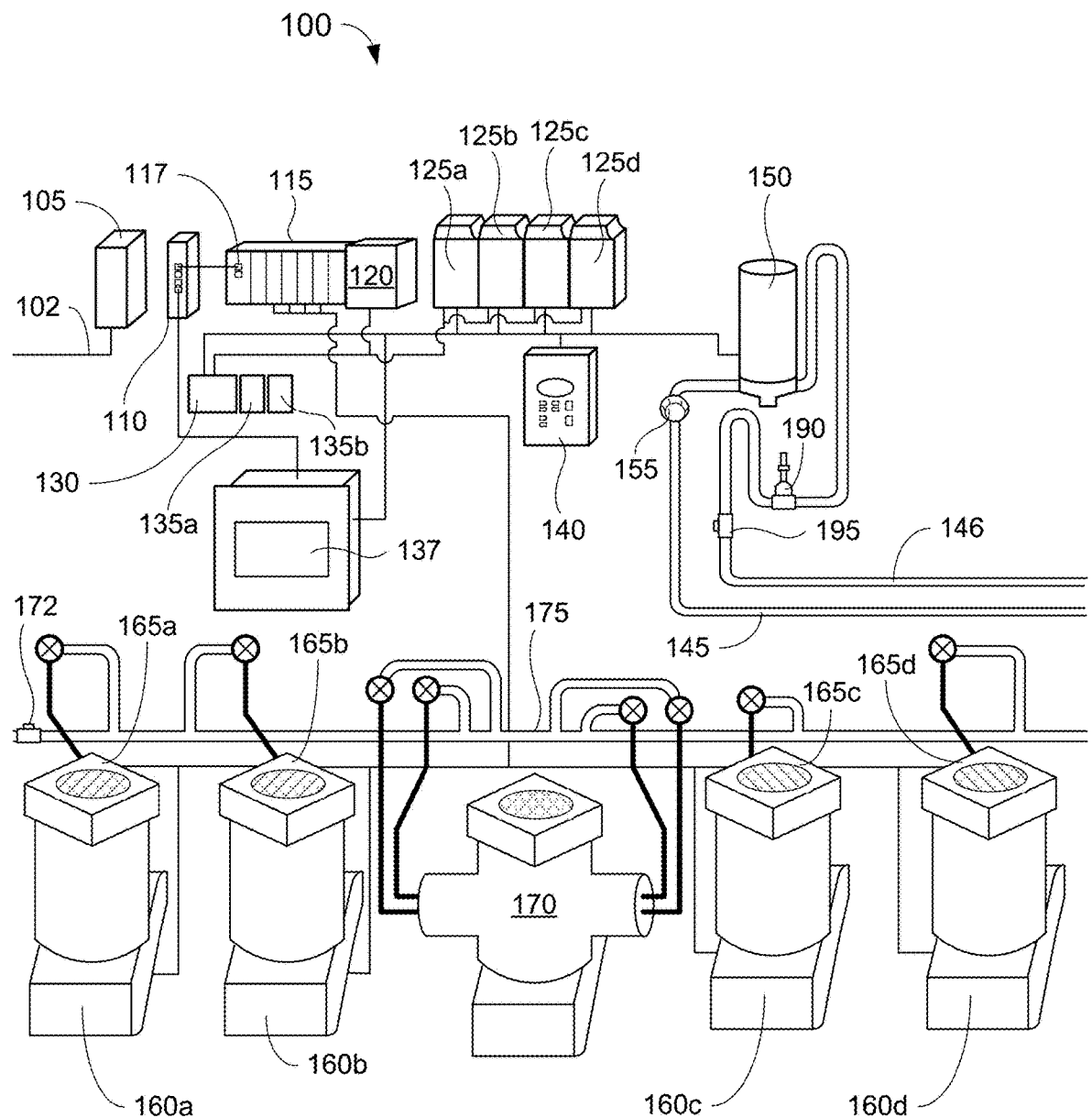
FIG. 5 is an exemplary automatic fertilization and/or irrigation apparatus capable of implementing embodiments of the invention.

FIG. 5 shows an automatic fertilization and/or irrigation apparatus 100 comprising a power input 102, a power transformer 105, a wireless switch or router 110, a programmable logic controller (PLC) 115, a serializer/deserializer 117, an expansion module 120 for the PLC 115, first variable frequency drives 125a-d, wiring terminals 130, safety relays 135a-b, a human-machine interface (HMI) 137, a second variable frequency drive 140, a recirculation input 145, a recirculation filter 155, a recirculation pump 150, a pH probe 190, a flow switch 195, a recirculation output 146, pumps 160a-d, pump fans 165a-d, an acid pump 170, and a flow and/or pressure switch 172. The apparatus 100 further comprises a container (not shown) configured to house all of the components shown in FIG. 5. In use, the container may be sealed and/or locked, and may be configured to provide a substantially waterproof housing for the components enclosed therein. The container may comprise plastic and/or a metal, as described herein. When the container comprises plastic, a static electrical charge may build up on the container, introducing the risk of shock to personnel working with the apparatus and of short-circuiting or other damage to the components. Thus, the container may further comprise a powder coating on an exterior surface thereof, which may be adapted to dissipate or eliminate a static charge on the container. Independently, a different coating may be applied to an exterior surface of the container that is adapted to resist, reduce or inhibit corrosion of or UV damage to the container. The apparatus 100 may further comprise a system fan (not shown) configured or adapted to cool the interior environment or atmosphere of the apparatus (e.g., when in a sealed or locked container).

The power input 102 receives external electrical power and supplies electrical power to the apparatus 100. The external electrical power received by power input 102 may come from an electric power grid, such as an electrical outlet, energy storage devices such as batteries or fuel cells, generators or alternators, solar power converters, etc. The voltage and/or current on the power input 102 may depend on the specific requirements of the apparatus (e.g., 120-480 V for AC and 12-90 V for DC).

The power transformer 105 converts the electrical power from the power input 102 to a corresponding voltage, current, and/or frequency to power the load of the apparatus 100. The power transformer 105 may also regulate the voltage and/or current provided to the components of the apparatus 100. The power transformer 105 may be a power supply having multiple power outputs at varying voltages (e.g., lower voltages may be supplied to the PLC 115, while higher voltages may be supplied to the variable frequency drives 125a-d and 140, and the pumps 150, 160a-d, and 170). The power transformer 105 may also limit the current drawn by a particular load (e.g., to a component) to safe levels, shut off the current to one or more components or to the entire system in the event of an electrical fault or an alarm (e.g., from a flow and/or pressure switch 172 in the main irrigation line 175), prevent electronic noise or voltage/current surges on the input 102 from reaching the load(s), and optionally store energy to continue powering the load(s) in the event of a temporary interruption to the input 102 (e.g., provide an uninterruptible power supply). When the power transformer 105 shuts off the current due to an electrical fault or an alarm, the PLC 115 may latch or record some or all performance and (optionally) site information in an associated memory prior to or at the time of shut down. The power transformer 105 may include additional inputs and outputs for functions such as external monitoring and control (e.g., to connect a multimeter). In alternative embodiments, one or more of the electrical components of the apparatus 100 may include additional and separate power inputs 102 or power transformers 105. Connections between the power transformer 105 and the electrical components of the apparatus 100 are omitted for clarity of the drawing.

The wireless switch or router 110 is a gateway for receiving and transmitting data (e.g., digital packets including a header and a body) wirelessly to and from a network (e.g., over the internet). The wireless switch or router 110 may be connected (e.g., by a serial wire or cable, using an ethernet protocol) to a network interface (e.g., network card)

in the PLC 115, and may also include or be directly connected to an antenna that transmits and receives wireless signals (e.g., to and from a cellular network, such as a 4G, 5G or 6G network).

The serializer/deserializer (SERDES) 117 connects the wireless switch or router 110 and the PLC 115, and converts (i) serial data from the wireless switch or router 110 to parallel data for processing by the PLC 115, as well as (ii) parallel data from the PLC 115 to serial data for transmission by the wireless switch or router 110. Thus, the wireless switch or router 110 may have a serial data interface, and the PLC 115 may have a parallel interface. In alternative embodiments, the switch or router 110 may transmit and receive electrical signals using a ground-based network (e.g., a cable, telephone/DSL, or fiber-optic network).

The digital packets from the PLC 115 may include site information (e.g., nutrient delivery amounts and/or rates, a pH, irrigation on/off times, differences from target values, etc.), and may be organized into a table to be stored in a database (e.g., a SQL database) on a remote server. The table may be processed by software and displayed in summary report readable by a spreadsheet program such as Microsoft® Excel.

The PLC 115 may include one or more input modules, one or more output modules, and a central processing unit (CPU), and may include one or more arithmetic logic units (ALUs). The PLC 115 may include one or more microprocessors, microcontrollers, field programmable gate arrays (FPGAs), complex programmable logic devices (CPLDs), application specific integrated circuits (ASICs), or application specific standard products (ASSPs). The PLC 115 may include volatile memory (e.g., cache memory, random access memory [RAM]), nonvolatile memory (e.g., fuses, read-only memory [ROM], erasable and programmable memory [EPROM, EEPROM, or flash memory], or a solid-state drive), or both. The nonvolatile memory (or other tangible storage medium) may store basic instructions such as a basic input/output system (BIOS), identification code, and/or a program (instructions to be executed by the CPU) that controls the pumps 160*a-d* and/or 170.

The input modules may receive input data from the pH sensor 190, the pumps 160*a-d* and 170, and sensors in or operably linked to pumps 160*a-d* and 170, and the output modules may transmit performance data for the apparatus 100 to the SERDES 117 and control signals to the variable frequency drives 125*a-d* and 140 to control the pumps 160*a-d* and 170. For example, if the input data (e.g., from a flow sensor operably linked to one of the pumps 160*a-d*) indicates that the pump is delivering too little of a fertilizer or nutrient, the program may generate performance data and/or a control signal to a corresponding one of the first variable frequency drives 125*a-d* to increase the speed of the pump. The performance data may be stored in the memory to be later transmitted to an end user (e.g., a data analyst) using the wireless switch or router 110.

The expansion module 120 for the PLC 115 may include inputs and outputs for both digital and analog signals. For example, some of the analog inputs may be connected to level sensors (e.g., optical, sonar or radar level sensors) that detect the volume of liquid in chemical tanks or vessels (not shown) that provide the fertilizer, nutrient or micronutrient to the pumps 160*a-d* and 170. If the volume of liquid in one of the tanks or vessels is too low, an alarm may be triggered, and the program may instruct one of the variable frequency drives 125*a-d* and/or 140 (e.g., using one or more analog outputs of the expansion module 120) to shut off the corresponding one of the pumps 160*a-d* and/or the pump 170. Some of the digital inputs of the expansion module 120 may receive outputs from the HMI 137 (e.g., via the wiring terminals 130).

The program in the PLC 115 may organize the data into digital packets to be transmitted to a remote user (e.g., a data analyst) using the wireless switch or router 110. The HMI 137 is configured to output various signals (via the wiring terminals 130) to the expansion module 120 for the PLC 115, thereby allowing a user such as a field technician to change settings (e.g., fertilizer or nutrient targets, irrigation cycles, etc.) in the PLC 115 using a graphical user interface (GUI) on the HMI 137. The HMI 137 thereby functions as a user portal to the PLC 115 and the programming therein, allowing the user to make changes to the system controlled by the PLC 115 without directly making changes to the PLC programming. The GUI may be accessible using buttons and/or a touch screen. In alternative embodiments, the HMI 137 may be a smartphone, laptop, tablet or other computer application, and the PLC 115 may be connected wirelessly to the smartphone, laptop, tablet or other computer to change settings in the PLC 115.

The variable frequency drives 125*a-d* and 140 control the pumps 160*a-d* and 170, respectively, based on control signals from the PLC 115. Values and/or on-off cycles of the control signals correspond to the settings in the PLC 115 and/or the performance data stored in the PLC 115. The variable frequency drives 125*a-d* and 140 may vary the voltage, frequency and/or pulse width(s)/duty cycle(s) of the control signals to the pumps 160*a-d* and/or 170. The variable frequency drives 125*a-d* and 140 may be DC-AC or AC-AC systems, depending on the output of the power transformer 105. The variable frequency drives 125*a-d* and 140 may be pulse-width modulation (PWM) drives, current source inversion (CSI) drives or voltage source inversion (VSI) drives. If any of the pumps 160*a-d* and/or 170 require pulsed signals (e.g., the pump is solenoid-driven), the PLC 115 may provide the pulsed signal(s) through one or more high-speed outputs wired to one or more corresponding optical (e.g., solid state) relays directly wired to the pump.

The wiring terminals 130 may receive wires from level sensors, power terminals, and output lines (e.g., from the HMI 137), and provide signals to other components, such as the PLC 115 (e.g., through the expansion module 120), the variable frequency drives 125*a-d*, and the recirculation pump 150. The safety relays 135*a-b* may include voltage regulators, varistors, and/or surge protectors. Additional safety relays (not shown) may be used as a fail-safe control and optionally as a de-bounce circuit configured to maintain power momentarily during false-negatives from the fail-safe control relay.

The recirculation input 145 receives sampled water to be tested and the recirculation output 146 returns the sampled water to the main irrigation line 175. The recirculation pump 150 pulls a sample of the irrigation water from the main irrigation line 175 (see, e.g., FIG. 5) through the recirculation input 145. The irrigation water sample is taken from the main irrigation line 175 at a location (not shown) downstream from the locations where the pumps 160*a-d* and 170 and/or the apparatus 100 introduce the fertilizers, nutrients and/or micronutrients into the main irrigation line 175. The recirculation input 145 may also include multiple bends, turns, and/or changes in dimensions to ensure thorough mixing prior to measurement of one or more parameters and/or characteristics (e.g., pH) of the irrigation water. The irrigation water sample passes through a recirculation filter 155 that may function as a flow switch to allow the water sample to flow into a monitoring system and/or as a filter to remove undissolved particles above a predetermined size (e.g., using a mesh strainer or other filtering material). The pH probe 190 measures the pH of the irrigation water sample with the fertilizers, nutrients and/or micronutrients added thereto, and may transmit the pH data to the PLC 115. The PLC 115 may then transmit the pH data to a remote computer via the wireless switch or router 110 and, depending on the difference between the measured pH and a target pH, the variable frequency drive 140 to adjust (e.g., increase or decrease the speed, frequency and/or stroke of) the pump 170. Alternatively, if one of the fertilizers, nutrients and/or micronutrients is an acid or base, a corresponding one of the variable frequency drives 125a-d may adjust the speed, frequency and/or stroke of a corresponding one of the pumps 160a-d. The flow switch 195 allows the sampled water to return to the main line through the recirculation output 146. In alternative embodiments, additional probes may determine or measure another parameter of the irrigation water sample, such as hardness, conductivity, total dissolved solids, temperature, etc.

The pumps 160a-d each control the addition of one or more fertilizer, nutrient and/or micronutrient components to the main line. For example, each of the pumps 160a-d may control the feed rate of a fertilizer, nutrient or micronutrient to the irrigation water in the main irrigation line 175. The fertilizers and/or nutrients may comprise one or more sources of nitrogen, phosphorous, potassium, carbon, and/or calcium. The micronutrients generally comprise an element or chemical provided in small or trace amounts or concentrations, such as boron, zinc, manganese, iron, copper, cobalt, magnesium, molybdenum, etc. The pumps 160a-d may also control the addition of other supporting chemicals or additives (e.g., an acid or base, etc.). The pump fans 165a-d may cool the pumps 160a-d to prevent overheating.

The pump 170 is similar or substantially identical to the pumps 160a-d. In the embodiment shown in FIG. 5, the pump 170 is larger than the other pumps 160a-d to provide a higher output than the other pumps, but in many cases, the pump 170 is identical to or smaller than the other pumps 160a-d. In one example, the pump 170 controls the addition of acid to the main irrigation line 175. Alternatively, the pump 170 may control the addition of base or a relatively high-volume fertilizer and/or nutrient, such as a nitrogen- or potassium-containing fertilizer and/or nutrient, to the main irrigation line 175. Each of the pumps 160a-d and 170 may include an AC motor electrically connected to the variable frequency drives 125a-d and/or 140. Each of the pumps 160a-d and 170 may be connected to a chemical tank (e.g., the fertilizer/nutrient tanks 115a-d or the acid tank 120 shown in FIG. 5) using feed lines. Each of the pumps 160a-d and 170 may be a positive displacement or a centrifugal pump, although the pumps 160a-d and 170 are not limited thereto.

In the apparatus 100, for example, all information can be recorded automatically and transmitted using a cellular network and may be accessed at any time (e.g., using a computer or mobile device). The automatic logging of data can occur at adjustable time intervals. Information may be transmitted automatically to field technicians, data analysts, managers, customers and other users using short message service (SMS, e.g., cellphone texts), email, etc., to inform the users of important alerts.

The apparatus 100 enables a user to know when a site is running. For example, the PLC 115 may detect a positive flow rate in the main line using a flow sensor. This ability allows a field technician to visit a site only when it is in operation. This ability is important since manual adjustments to components of the apparatus 100 are most effectively made when water is flowing through the main line.

All pertinent information for the site (e.g., the site name, acreage, fertilizer/nutrient targets, and irrigation hours) can be stored in both the PLC 115 and in a remote computer or server. This redundancy of information storage reduces errors in transferring and processing information. All such information may be accessed or changed remotely at any time.

The apparatus 100 can perform pH calibration using any number of points (e.g., 1, 2, 3, or any number of 1 or more; more pH calibration points providing for a more accurate pH measurement), and the calibration points may be adjustable. Calibration errors can be indicated (e.g., by an alarm), and a reason may be given for the error (e.g., a malfunctioning pH probe, improper calibration standard, etc.). For example, alarms for the connectivity of the pH probe 190 and inappropriate signal conditions can be indicated.

Set-up of acid (e.g., formic acid, $H_2SO_4$, etc., although any acid may be used) and base (e.g., KOH, although any base may be used) for neutralization (e.g., pH balancing) may be performed automatically in the apparatus 100 by initiating operation of the acid and base pumps (e.g., one of the pumps 160a-d providing the base and the acid pump 170) at a relatively low speed or feed rate (e.g., a minimum speed or rate), then slowly increasing the speed of the acid and base pumps with the corresponding variable frequency drives (e.g., one of the VFDs 125a-d and the VFD 140) while monitoring the pH of the resulting irrigation water until the base (e.g., KOH) attains its target setting, unless the pH falls outside a predetermined and/or desired range, in which case the acid is adjusted (e.g., the speed of the acid pump 170 is increased or decreased) to bring the pH within the predetermined and/or desired pH range. All parameters are adjustable. Any subsequent automatic changes in the base feed rate (e.g., KOH pump output) may be executed slowly to allow for the control of the pH without large fluctuations.

Fertilizer, nutrient and other chemical tank levels may be measured using sonar, radar or optical sensors. The accuracy of this measurement is controlled or determined only by the sensor accuracy (e.g., the approximate accuracy of conventional and/or state-of-the-art sonar sensors is +/−0.125 inches). This measurement avoids errors related to human measurements from a baseline (e.g., the bottom of the tank, the ground, and/or the height of the liquid along the sides of the tank).

The apparatus 100 may include continuous tank level monitoring, which also provides the ability to detect tank leaks before a large amount of material has left the tank. Automated monitoring detects a significant change in a tank level that cannot be explained by normal usage, and can trigger an alarm that may be transmitted using SMS, email, etc., to one or more persons (e.g., a field technician, data analyst or account manager) to notify the person(s) that corrective action may be necessary. Also, when a tank level sensor determines that the chemical tank is empty (or nearly empty), the PLC 115 can set the corresponding variable frequency drive 125a-d or 140 to zero, and transmit a notice to a user (e.g., the data analyst) to take corrective action (e.g., to ship or send the corresponding fertilizer[s], nutrient[s] and/or micronutrient[s] to the site). This action also prevents the corresponding pump 160a-d or 170 from running dry, which may cause significant damage.

The outputs of the pumps 160a-d and 170 may be frequently or continually monitored by the PLC 115, which can send one or more commands to the corresponding variable frequency drive(s) 125*a-d* and 140 to change the pump speed, and optionally a servo/stepper motor-type control of the stroke setting, thereby changing the pump output (e.g., to meet a defined or modified volumetric demand). Over- and under-feeds can be minimized (typically less than 2%) based on weekly targets, resulting in nearly linear feed rates (e.g., over the course of a growing schedule or crop cycle). This ability has been tested under rigorous and/or extreme conditions, such as very high feed rates, short irrigation times, and/or severely inaccurate pump performance (e.g., greater than 40% from theoretical). Overheating of the pumps 160*a-d* is prevented by the cooling fans 165*a-d* mounted to each of the pumps 160*a-d*.

The output of each pump may be calculated automatically by the PLC 115, based on fertilizer/nutrient targets, flow rates, concentrations of fertilizers/nutrients in the tanks, irrigation hours (e.g., irrigation water and fertilizer/nutrient pump on/off times), etc., thus reducing the possibility of human error. A theoretical pump stroke setting is calculated and recommended to the user (e.g., field technician, farm manager, customer, etc.). Pump outputs may be adjusted remotely at any time. Pump performance may be monitored periodically (e.g., every 3 minutes, 15 minutes, hour, 2 hours, 4 hours, etc.) or continuously, and alarms may be triggered for poorly performing pumps. Alarms such as pump alarms, pH alarms and irrigation flow alarms can be configured to shut down the entire system, and optionally, latch or record some or all system information in an onboard memory (e.g., in case power is shut off or disconnected).

The apparatus 100 enables a user to enter a pump correction factor to account for a known (e.g., empirically determined) performance deficiency in a pump. This ability allows for the system to more accurately feed a fertilizer, nutrient or micronutrient and to determine the amount of fertilizer, nutrient or micronutrient supplied to the irrigation water over a given length of time. All calculations can be performed by the PLC 115 and/or a remote computer to reduce errors. Summary reports can be generated and/or transmitted automatically, periodically (e.g., at adjustable time intervals) or on demand.

The apparatus 100 may include fail-safe controls to ensure that irrigation water is flowing when the apparatus 100 is operational. This can be accomplished by a flow-and-pressure switch in the irrigation water main line. Fail-safe controls to ensure functionality of the recirculation pump may be accomplished using a flow switch 155 (e.g., configured to allow irrigation water to flow from the main line to the recirculation pump 150 when water is flowing) in the recirculation line 145. In the example in FIG. 5, the flow switch 155, the recirculation pump 150 and the recirculation line 145 draw treated water (to which the fertilizers, nutrients and micronutrients have been added) from the irrigation line 175 to be analyzed for pH. If the flow-and-pressure switch in the irrigation water main line of the flow switch 155 is not triggered, the corresponding pumps are turned off by removing power from the pumps. However, the variable frequency drives may remain on. Thus, the fail-safe controls may prevent the variable frequency drives from shutting down. A delay (e.g., of 1-60 seconds, or any value or range of values therein, such as 10 seconds) to keep components of the apparatus 100 operational in the temporary absence of electrical power may be accomplished by an electronic de-bounce circuit, as discussed herein. A secondary fail-safe may be triggered by the same conditions (e.g., lack of flow or pressure in the main line, or lack of flow in the recirculation line 245), resulting in the speed of each pump being set to zero on the variable frequency drive after a predetermined and/or adjustable length of time.

Fail-safe control for pH is accomplished by setting the variable frequency drive to zero for either the acid pump or the base pump if the pH is too low or too high, respectively. This action prevents the drive(s) for the acid and/or base pumps from shutting down. Stopping the acid or base pumps can result in wild swings in pH. If the pH goes above or below the acceptable range more than a predetermined number of times, the apparatus 100 may return to a slow start mode, in which the acid and base pumps are set to their minimum settings. The speed of the acid and base pump is then either increased or kept constant to ensure that the pH stays within the desired range. When the base pump (e.g., providing KOH to the irrigation water) attains its target setting, the acid pump can then be adjusted independently to maintain the desired pH set point. All such parameters may be adjustable. This method for controlling the pH of irrigation water using the apparatus 300 has been proven to be very effective in maintaining the pH of the treated irrigation water in the desired range (e.g., 6.5±0.5, or any range within this range).

Figure 6:
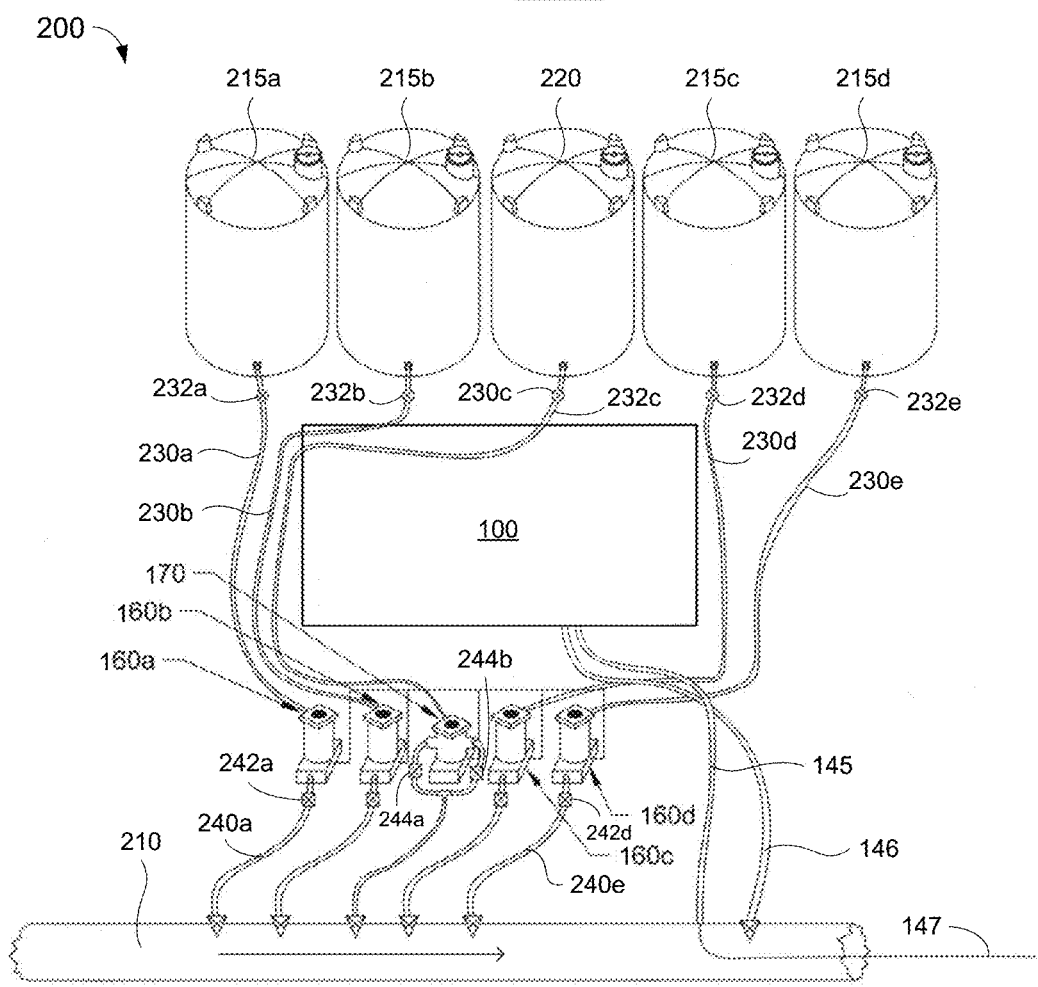
FIG. 6 is an exemplary automatic fertilization and/or irrigation system capable of practicing embodiments of the invention.

FIG. 6 shows an exemplary automatic fertilization and/or irrigation system 200 including the exemplary automated apparatus 100 shown in FIG. 5, configured to controllably add a plurality of fertilizers, nutrients and/or micronutrients to irrigation water and to control the pH of the treated irrigation water. The automatic fertilization and/or irrigation system 200 includes, in addition to the automatic fertilization and/or irrigation apparatus 200, a plurality of fertilizer, nutrient and/or micronutrient tanks 215*a-d*, an acid tank 220, a main irrigation water line 210, a plurality of fertilizer, nutrient and/or micronutrient supply conduits 230*a-e*, and a plurality of fertilizer, nutrient and/or micronutrient feed conduits 240*a-e*.

Each of the tanks 215*a-d* is adapted to contain and supply of an aqueous solution of one or more fertilizers and/or nutrients, and/or (optionally) one or more micronutrients. Typically, a first one of the tanks 215*a-d* contains and supplies a nitrogen-containing fertilizer and/or nutrient, a second one of the tanks 215*a-d* contains and supplies a phosphorous-containing fertilizer and/or nutrient, and a third one of the tanks 215*a-d* contains and supplies a potassium-containing fertilizer and/or nutrient, although other configurations are possible. In many cases, the tanks 215*a-d* that contain and supply the nitrogen-containing, phosphorous-containing and/or potassium-containing fertilizer and/or nutrient also contain and supply one or more additional fertilizers and/or nutrients, as described herein. In many embodiments, a fourth one of the tanks 215*a-d* may contain and supply a micronutrient mixture. Alternatively, one of the tanks 215*a-d* may contain and supply the acid(s) or base, alone (e.g., aqueous formic or sulfuric acid) or in combination with a nitrogen-containing, phosphorous-containing and/or potassium-containing fertilizer and/or nutrient (e.g., aqueous phosphoric acid or aqueous KOH).

The acid tank 220 in the embodiment shown in FIG. 6 contains and supplies a concentrated acid, for continuously adjusting untreated irrigation water having a neutral or slightly alkaline pH to a neutral or slightly acidic pH. In one example, the acid tank 220 contains and supplies concentrated aqueous sulfuric acid, but other acids are also acceptable (e.g., concentrated or dilute [e.g., 20-95 wt. %] aqueous formic acid, which also provides carbon and may reduce or eliminate scaling; concentrated aqueous phosphoric acid, which also provides phosphorous; concentrated aqueous nitric acid, which also provides nitrogen; etc.). Alternatively, when the tank 220 has a larger volume that some or all of the tanks 215*a-d*, the tank 220 may contain and supply a relatively high-volume fertilizer and/or nutrient (e.g., a nitrogen- and/or potassium-containing fertilizer and/or nutrient), and one of the tanks 215*a-d* may contain and supply the acid or base, as described herein.

Each of the fertilizer, nutrient and/or micronutrient supply conduits 230*a-e* includes a corresponding first valve 232*a-e* configured to control (e.g., open, close, and optionally restrict) a flow of the corresponding fertilizer, nutrient and/or micronutrient from the corresponding tank 215*a-d* or 220 to a unique or corresponding one of the pumps 160*a-d* and 170. Each of the fertilizer, nutrient and/or micronutrient feed conduits 240*a-b* and 240*d-e* includes a corresponding second valve 242*a-d* configured to control the addition of the corresponding fertilizer, nutrient and/or micronutrient by the corresponding pump 160*a-d* or 170 to the main irrigation line 210. The fertilizer, nutrient and/or micronutrient feed conduit 240*c* may have two valves 244*a-b* configured to control the addition of the acid (or, alternatively, a relatively high-volume fertilizer and/or nutrient) to the main irrigation line 210.

As shown in FIG. 6, the recirculation input 145 can include a sampling conduit 147, configured to withdraw a sample of the treated irrigation water a predetermined distance (e.g., 3-40 feet, 1-10 m, or any distance or range of distances therein) along the main irrigation water line 210. The recirculation output 146 returns the sampled treated irrigation water to the main irrigation water line 210 in the same or a similar manner as the feed conduits 240*a-e*.

Modes of Operation

The apparatuses 100 and/or 200 may be operated in one of a plurality of different modes: continuous mode, intermittent mode, and slug mode. In continuous mode, the water in the main irrigation line is continuously treated with small amounts of one or more fertilizers, nutrients and/or micronutrients. Thus, all of the water that reaches the crops from the main irrigation line can include fertilizer(s), nutrient(s) and/or micronutrient(s). In intermittent (e.g., semi-continuous) mode, the water in the main irrigation line is treated intermittently with one or more fertilizers, nutrients and/or micronutrients (e.g., twice a day, once a day, once a week, once every two weeks, etc.). Thus, some of the water that reaches the crops from the main irrigation line is treated with fertilizer(s), nutrient(s) and/or micronutrient(s), and some is not. In slug mode, the water in the main irrigation line is treated with a very large amount of fertilizer(s), nutrient(s) and/or micronutrient(s) a predetermined number of times (e.g., once, twice, 3 times, 4 times, etc.) during a growing season. At the same or a later time, one or more of the same and/or different fertilizers, nutrients and/or micronutrients may be added to the water in the main irrigation line. In the present method, formic acid and/or a formate salt solution may be added to the irrigation water using the apparatus 100 or 200, but the resulting formate-enhanced irrigation water is not applied or distributed to the soil using the emitters. Instead, formate-enhanced irrigation water is applied or distributed to the soil by opening a bypass valve in the irrigation water conduits to the field(s) or block(s), which effectively bypasses the emitters and floods the field(s) or block(s).

The apparatus(es) may combine the continuous, intermittent, and/or slug modes. For example, the water in the main irrigation line may be treated with one or more fertilizers, nutrients, micronutrients or soil additives (e.g., formic acid and/or a formate salt) in slug mode at the start of the irrigation cycle, and then treated with one or more of the same or different fertilizers, nutrients and/or micronutrients in continuous mode at a later point in the irrigation cycle.

Continuous mode uses the fertilizers, nutrients and/or micronutrients most efficiently since crops generally have a fixed requirement rate (e.g., 50 grams per day for a single plant) for the fertilizers, nutrients and/or micronutrients. Continuous mode treats the irrigation water with an optimal and/or optimized amount of fertilizer for the crop (e.g., the amount of fertilizer used by that crop in a day, week, month, etc.), and thus minimizes or avoids overfeeding or underfeeding the crop. By comparison, in a manual system, fertilizer is generally fed at a much faster rate. As a result, the crop may not be able to metabolize the relatively large level of fertilizer, nutrient and/or micronutrient. If a rain event occurs, the excess fertilizer(s), nutrient(s) and/or micronutrient(s) may be washed away from the soil. Subsequent irrigations without fertilizer, nutrient or micronutrient may also wash excess fertilizer(s), nutrient(s) and/or micronutrient(s) away from the soil.

Before the fertigation system is operated, the storage tanks are installed and filled with fertilizers, nutrients, micronutrients and/or soil additives in known concentrations and amounts. In some embodiments, site information (e.g., nutrient targets, irrigation cycles and/or times, etc.) may be entered into the programmable logic controller (PLC).

Initiation and/or startup of the system may comprise the following steps. First, the irrigation water pump is turned on, and the irrigation water begins to flow through the main irrigation line. Next, the PLC senses water flow and pressure in the main irrigation line, as described herein. Once the required flow and pressure is achieved in the main irrigation line, the PLC may begin to control a first pump that adds acid or base (e.g., formic acid, potassium bisulfate, sulfuric acid or aqueous KOH) to the main irrigation line to bring the pH of the irrigation water to a target pH, while monitoring the pH of the irrigation water, continuously or periodically. The addition of acid or base may be controlled (e.g., adjusted, increased or decreased slowly) until a stable pH at the target value, plus or minus a predetermined margin (e.g., ≤±0.5) is achieved.

Although any target pH may be achieved, crops in a particular region tend to metabolize most fertilizers, nutrients and micronutrients most efficiently at a particular pH. For example, in California, irrigation water may have a pH in the range of 7.5-8.5, but many crops metabolize most or all fertilizers, nutrients and micronutrients most efficiently at a pH of about 6.5 (e.g., 6.5±0.5, 6.5±0.3, 6.5±0.2, or any other range within the target pH±0.5). Thus, in California, the target pH may be about 6.5, and the PLC controls the rate of addition of formic acid, potassium bisulfate or sulfuric acid to the irrigation water until the irrigation water is at the target pH or in the target pH range for a predetermined minimum period of time (e.g., 1 minute, 5 minutes, 15 minutes, 1 hour, or any other minimum length of time of at least 1 minute). Alternatively, the PLC may control the addition of acid to the irrigation water until the irrigation water is at a target pH in the range of 4.0-5.5, 2.0-4.0, etc., as described herein.

Once the target pH is achieved (or when the required flow and pressure is achieved in the main irrigation line), the PLC begins adding, then controlling the rate of addition of, one or more fertilizers, nutrients and/or micronutrients using one or more additional pumps. The fertilizer(s), nutrient(s) and/or micronutrient(s) may be as described herein. For example, the PLC may add, then control the rate of addition of, first, second, third and fourth fertilizers, nutrients and/or micronutrients by first, second, third and fourth pumps. When one of the fertilizers, nutrients and/or micronutrients is or comprises phosphoric acid, the pH of the irrigation water may decrease, so the PLC may adjust the rate of base using the corresponding pump to bring the pH back to the target pH or pH range. When treating the soil to increase the permeation depth and/or rate of the irrigation water into the soil, the PLC may increase the rate of addition of formic acid (as described herein), but precautions can be taken not to overfeed a corresponding fertilizer and/or nutrient at any time or underfeed a corresponding fertilizer and/or nutrient over a prolonged period of time.

Once the target levels of potassium-, nitrogen- and phosphorus-containing fertilizers and/or nutrients are achieved, the PLC may determine that a target rate or amount of calcium, carbon, sulfur, or micronutrients (e.g., a mixture of magnesium, boron, iron, cobalt, copper, manganese, molybdenum and/or zinc) may not yet be met. The PLC may then begin adding, then controlling the rate of addition of, a calcium-containing fertilizer and/or nutrient, a carbon-containing fertilizer or nutrient, a sulfur-containing fertilizer or nutrient, and/or the micronutrients using one or more corresponding pumps, and adjusting the rate of addition with the corresponding pump(s) until the target level(s) of fertilizer(s), nutrient(s) or micronutrients are achieved in the irrigation water. Throughout this process, the irrigation water is maintained at the target pH or in the target pH range, as described herein.

When the main irrigation water pump shuts off, the PLC may sense a decrease in pressure in the main irrigation water line, and may consequently shut down all of the pumps. In some embodiments, the PLC shuts down the pumps slowly (e.g., in accordance with predetermined decreases, or a predetermined rate of decrease, in the pressure or flow rate in the main irrigation water line). The system (including the PLC) may do so while maintaining the pH of the irrigation water at the target pH. When the PLC determines a no-flow condition, the pumps are turned off, and the irrigation system is shut down.

The PLC may send a report to an email account (using the wireless switch or router) specifying the levels or amounts of potassium bisulfate and other fertilizer(s), nutrient(s) and/or micronutrient(s) added to the irrigation water. For example, the levels (or amounts per unit area) of the potassium bisulfate and other fertilizers, nutrients and micronutrients may be calculated and reported in units of lbs./acre (e.g., to the nearest 0.1 lb./acre), $kg/km^2$, $mg/m^2$, etc. When the email is received by a remote computer adapted to receive and process such reports, if the report contains no errors (e.g., errors that are detectable by the remote computer having a software program or app thereon configured to receive and process such reports), then the report may be automatically forwarded to one or more further recipients (e.g., a customer, an account manager, a field technician, etc.).

In some cases, the irrigation water pump may be turned on or off (e.g., manually) for a period of time different from that specified in the programming or data entered into the PLC. In such cases, the system has no control or advance knowledge of the time interval during which the irrigation pump is run or operated, but can respond adjustably to underfeeds and overfeeds resulting from a difference between the expected and actual time intervals of operation.

For example, the PLC may be programmed to calculate feed rates of the fertilizers, nutrients, micronutrients or soil additives for a given day based on an expected 8-hour irrigation schedule. However, for example, a grower, field manager or field technician may actually run the irrigation water pump for 7 hours or 9 hours on the given day. In this event, the PLC tracks the time interval(s) during which the pump is run or operated, and adjusts the feed rate of the fertilizer, nutrient and micronutrient pumps proportionally for the next scheduled irrigation day. In the example where the irrigation water pump is run for 7 hours, the feed rate of the fertilizer, nutrient and micronutrient pumps is increased to 114-115% ($8/7^{ths}$) of the programmed rate on the next scheduled irrigation day, and the example where the irrigation water pump is run for 9 hours on the given day, the feed rate of the fertilizer, nutrient and micronutrient pumps is decreased to 88-90% ($8/9^{ths}$) of the programmed rate on the next scheduled irrigation day. As a result, on the next irrigation day (or other period of time during which such adjustments and/or corrections are made), the PLC may correct for variations in the irrigation schedule in order to achieve the target rates over a longer period of time. If further changes occur, the PLC can maintain the desired profile by slowly making the appropriate changes or adjustments. In general, the longer the time period for such changes or adjustments, the greater the likelihood of avoiding any undesired spikes in the potassium bisulfate or other fertilizer/nutrient feed rate.

The system can turn on and off any fertilizer, nutrient, micronutrient or soil additive in accordance with predetermined and/or calculated targets and schedules (e.g., the fertigation profile). For example, the system may keep the pump for supplying phosphorous-based fertilizers and/or nutrients off until a predetermined starting time in the growing season arrives. The user (e.g., a data analyst or other user of the remote computer) typically makes a change to a target or schedule only when conditions such as weather or crop growth necessitate such a change (e.g., to the fertigation profile). Otherwise, the system (and thus, the present method) can control the addition of fertilizers, nutrients, micronutrients and soil additives according to the initial (or modified) fertigation profile for the growing season.

Slug feeding dilute formic acid or formate salt solution to agricultural crops in a field using any of the systems and methods described herein may comprise adding the formic acid or formate salt solution to the irrigation water such that the concentration of formic acid or formate salt solution in the irrigation water (by weight) is from on the order of 10 ppm to about 10,000 ppm. When using formic acid, the concentration is generally 1000 ppm by weight or volume or less to avoid risks associated with water having a low pH. Thereafter, the method further comprises providing or delivering the resulting formate-enhanced irrigation water to the soil, as described herein.

Exemplary Fertilizers, Nutrients and Micronutrients

The present method may further comprise adding to the formate-enhanced irrigation water any water-soluble fertilizer, nutrient, micronutrient, or combination thereof. Typical fertilizers and nutrients may include sources of elements such as nitrogen and phosphorus, optional sources of elements such as calcium, sulfur, magnesium and carbon, soluble organic materials, soluble soil amendments, microbiologicals, etc.

Sources of nitrogen may include water-soluble compounds such as ammonia (which can also be a base), ammonium nitrate and ammonium chloride; urea, formamide, acetamide and ammonium carbonate (each of which can also be a source of carbon); ammonium phosphate (which can also be a source of phosphorous), ammonium sulfate (which can also be a source of sulfur), and alkaline earth ammonium halides such as calcium ammonium chloride and calcium ammonium nitrate (which can also be a source of calcium), magnesium ammonium chloride and magnesium ammonium nitrate (which can also be a source of magnesium), etc. Sources of phosphorus may include phosphoric acid and phosphonic acid (each of which can also be an acid), ammonium phosphate, ammonium phosphonate, alkali metal mono-, di- and tribasic phosphates and phosphonates such as lithium mono-, di- and tribasic phosphates, sodium mono-, di- and tribasic phosphates, and potassium mono-, di- and tribasic phosphates and phosphonates (which can also be a source of potassium), etc. Additional sources of potassium may include potassium carbonate and potassium bicarbonate (each of which can also be a base and/or a source of carbon), potash, potassium chloride, potassium nitrate (which can also be a source of nitrogen), potassium phosphate, and potassium thiosulfate (which can also be a source of sulfur), etc.

Potassium bisulfate is a source of sulfur. However, if needed, additional sources of sulfur may include ammonium sulfate and ammonium sulfite (each of which can also be a source of nitrogen), alkali metal sulfites (such as potassium sulfite, which is also a source of potassium), alkaline earth sulfates and sulfites (which, in the cases of calcium and magnesium, can also provide a source of calcium and magnesium, respectively), etc.

Sources of calcium may include calcium nitrate, calcium ammonium nitrate and calcium ammonium chloride (each of which can also be a source of nitrogen), calcium chloride, dibasic calcium phosphate (which can also be a source of phosphorous), calcium formate and calcium acetate (each of which can also be a source of carbon), and calcium thiosulfate (which can also be a source of sulfur), etc. Sources of magnesium may include magnesium chloride, magnesium formate and magnesium acetate (each of which can also be a source of carbon), magnesium sulfate and magnesium thiosulfate (each of which can also be a source of sulfur), etc. Sources of carbon may include, in addition to those listed herein, carbon dioxide (carbonic acid), formic acid, acetic acid, oxalic acid, malonic acid, acetoacetic acid (3-oxobutyric acid), etc., alkali metal and alkaline earth metal salts thereof, soluble carbohydrates, etc.

Micronutrients include sources of certain minerals and elements that are applied in relatively low concentrations (e.g., at molar ratios of 1:20 or less, 1:50 or less, 1:100 or less, 1:200 or less, etc., relative to each fertilizer and/or nutrient), and may include sources of elements such as boron, iron, cobalt, copper, manganese, molybdenum and zinc, and, to the extent not included in the fertilizers and nutrients, sources of calcium, sulfur, magnesium and carbon. Micronutrients such as boron, iron, cobalt, copper, manganese, molybdenum and zinc may be present as a nitrate salt, a water-soluble complex or chelate (e.g., using ammonia, EDTA, NTA, oxalic acid, malonic acid or a dialkyl ester thereof, etc.) of an oxide or hydroxide thereof, and in the cases of the metals, a corresponding halide salt (alone or as a complex with, e.g., ammonia, water, etc., and/or chelated with EDTA, NTA, oxalic acid, malonic acid or a dialkyl ester thereof, etc.), sulfate, formate, acetate, oxalate, etc.

Other components that may be included in the water-soluble fertilizer, nutrient, micronutrient, or combination thereof are water-soluble pesticides, herbicides (e.g., that are selective for weeds and relatively less toxic or non-toxic to the crop[s]), antifungal agents, antimicrobial agents and/or other biocides (e.g., ammonium phosphite), antiviral agents, antiscaling agents, etc.

As mentioned above, any fertilizer, nutrient or micronutrient may be added to the irrigation water. Thus, any commercial, water-soluble fertilizer may be fed alone or in combination with other water-soluble fertilizers, nutrients and additives, by fertigation (as described herein) or by slug feeding. As a result, standard fertilizers such as CAN-17, UAN-32, CN-9, N-pHuric, AN-20, Thiocal, potassium thiosulfate, urea, potash, phosphoric acid, and other commodity/commercially available fertilizers and additives may be applied simultaneously with the formic acid in the irrigation water.

CONCLUSION/SUMMARY

By providing formic acid or other sources of formate ions to soil at a concentration of 10-10,000 ppm, the present invention advantageously improves water permeation through soil in which plants or crops are growing or are to be grown. The present method may also increase uptake of nutrients and micronutrients by the plants or crops, decrease compaction of the soil, and/or increase aeration of the soil.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of increasing delivery of irrigation water and optionally a fertilizer to a predetermined depth in soil containing agricultural crops, comprising:
    introducing potassium formate to the irrigation water to form a formate-enhanced irrigation water having a formate concentration of from about 10 parts per million (ppm) to about 10,000 ppm;
    slug-feeding the formate-enhanced irrigation water to the soil in an amount sufficient to (i) increase a flow rate of the irrigation water through the soil, (ii) reduce a compaction of the soil, and/or (iii) reduce a calcium concentration in the soil;
    adding a fertilizer in continuous mode to additional irrigation water in an irrigation pipe to form fertigation water, wherein the fertilizer comprises a nitrogen fertilizer, a phosphorus fertilizer, a potassium fertilizer, or a combination thereof; and
    distributing the fertigation water through an irrigation system including the irrigation pipe to the soil.

2. The method of claim 1, wherein the potassium formate is introduced to the irrigation water using a pump, and the method further comprises controlling one or more settings of the pump using a controller in electrical communication with the pump, the one or more settings of the pump being configured to provide an amount of the potassium formate to the irrigation water to result in the formate-enhanced irrigation water having the formate concentration.

3. The method of claim 2, further comprising:
    storing in the controller (i) a target for the amount of the potassium formate to add to the irrigation water over a predetermined amount of time and (ii) settings for a pump corresponding to the amount of the potassium formate to be added over the predetermined amount of time;

comparing actual amounts of the potassium formate delivered over the predetermined amount of time with the target; and adjusting the settings for the pump to move the actual amount of the potassium formate delivered over the predetermined amount of time towards the target using the controller.

4. The method of claim 2, wherein the potassium formate is introduced to the irrigation water as an aqueous solution, the aqueous solution contains the potassium formate in a concentration of from 40% to 80% by weight, and the aqueous solution is introduced to the irrigation water at a flow rate ratio of 0.1:1000 to 10:1000.

5. The method of claim 2, wherein the pump is in an automatic fertilization and/or irrigation apparatus, and the formate-enhanced irrigation water is slug-fed to the soil by opening a bypass valve in the irrigation pipe to a field or block containing the soil.

6. The method of claim 1, wherein slug-feeding the formate-enhanced irrigation water to the soil comprises flooding a field or block containing the soil with a predetermined volume of the formate-enhanced irrigation water.

7. The method of claim 6, wherein the potassium formate is introduced to the irrigation water at an inlet in the irrigation pipe upstream from an outlet in the irrigation pipe in the field or block, or at the outlet in the irrigation pipe.

8. The method of claim 6, wherein the formate-enhanced irrigation water is slug-fed to the soil in the field or block at a flow rate of 1000 l to about 15,000 l per minute, for a length of time from about 1 hour to about 8 hours.

9. The method of claim 1, comprising adding the nitrogen fertilizer to the additional irrigation water.

10. The method of claim 9, wherein the nitrogen fertilizer is selected from the group consisting of ammonium salts, nitrate salts, urea and combinations thereof.

11. The method of claim 1, comprising adding the phosphorus fertilizer to the additional irrigation water.

12. The method of claim 11, wherein the phosphorus fertilizer is selected from the group consisting of phosphoric acid, monobasic phosphate salts, dibasic phosphate salts, and combinations thereof.

13. The method of claim 1, comprising adding the potassium fertilizer to the additional irrigation water.

14. The method of claim 13, wherein the potassium fertilizer comprises one or more potassium salts.

15. The method of claim 1, further comprising adding one or more micronutrients to the additional irrigation water.

16. The method of claim 15, wherein the one or more micronutrients are selected from the group consisting of zinc, iron, manganese, calcium, boron, magnesium, copper, cobalt and molybdenum.

17. The method of claim 1, wherein the formate concentration in the formate-enhanced irrigation water is from about 100 ppm to about 1000 ppm.

18. The method of claim 1, wherein, prior to slug-feeding the formate-enhanced irrigation water to the soil, the soil is compacted due to the accumulation of one or more insoluble materials in the soil, and the method further comprises percolating the formate-enhanced irrigation water into the soil, through a root zone of the agricultural crops in the soil.

19. The method of claim 1, wherein the fertigation water is delivered at a periodic interval selected from multiple days per week, multiple weeks in a season, and multiple days in a season.

20. The method of claim 1, further comprising filtering the irrigation water prior to adding the potassium formate to the irrigation water.

* * * * *